(12) United States Patent
Cho et al.

(10) Patent No.: US 11,037,132 B2
(45) Date of Patent: Jun. 15, 2021

(54) CARD-TYPE DEVICE AND PAYMENT METHOD

(71) Applicant: Samsung Electronics Co., Ltd., Suwon-si (KR)

(72) Inventors: Shi-yun Cho, Anyang-si (KR); Moon-joo Lee, Suwon-si (KR); Hee-seok Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 15/561,889

(22) PCT Filed: Feb. 2, 2016

(86) PCT No.: PCT/KR2016/001097
§ 371 (c)(1),
(2) Date: Sep. 26, 2017

(87) PCT Pub. No.: WO2016/159505
PCT Pub. Date: Oct. 6, 2016

(65) Prior Publication Data
US 2018/0114215 A1 Apr. 26, 2018

(30) Foreign Application Priority Data
Mar. 30, 2015 (KR) .................. 10-2015-0044234

(51) Int. Cl.
*G06Q 40/06* (2012.01)
*G06Q 20/34* (2012.01)
(Continued)

(52) U.S. Cl.
CPC ............. *G06Q 20/34* (2013.01); *G06Q 20/32* (2013.01); *G06Q 20/3223* (2013.01);
(Continued)

(58) Field of Classification Search
CPC ........ G06Q 40/00; G06Q 20/34; G06Q 20/32; G06Q 20/40; G06Q 20/3223; G06Q 20/4012; H04M 1/02
See application file for complete search history.

(56) References Cited

U.S. PATENT DOCUMENTS

2013/0013490 A1* 1/2013 Keller .................. G06Q 20/353
705/39
2013/0080322 A1 3/2013 Adolphe
(Continued)

FOREIGN PATENT DOCUMENTS

KR 10-2005-0048837 A 5/2005
KR 10-2005-0077311 A 8/2005
(Continued)

OTHER PUBLICATIONS

Lakshmisha Honnegowda, Syin Chan, and Chiew Tong Lau, Security Enhancement for Magnetic Data Transaction in Electronic Payment and Healthcare Systems, Apr. 2013, IACSIT International Journal of Engineering and Technology, vol. 5, pp. 332-335 (Year: 2013).*

*Primary Examiner* — I Jung Liu
(74) *Attorney, Agent, or Firm* — Jefferson IP Law, LLP

(57) ABSTRACT

Provided is a first mobile device having a card shape, the first mobile device including a storage unit configured to store one or more pieces of card payment information; a payment information transmission unit configured to transmit at least one of the one or more pieces of card payment information in a contact or contactless manner to a payment terminal; and a controller configured to determine whether the first mobile device is in a detached state with respect to a second mobile device or a cover of the second mobile device, and to determine whether to transmit the at least one of the one or more pieces of card payment information, (Continued)

based on the determination of whether the first mobile device is in the detached state.

12 Claims, 26 Drawing Sheets

(51) Int. Cl.
    *G06Q 20/40*     (2012.01)
    *G06Q 20/32*     (2012.01)
    *G07F 7/08*     (2006.01)
    *G07F 7/10*     (2006.01)
    *G06Q 20/36*     (2012.01)
    *H04M 1/02*     (2006.01)
    *H04M 1/18*     (2006.01)
    *H04M 1/72412*     (2021.01)

(52) U.S. Cl.
CPC ..... *G06Q 20/3226* (2013.01); *G06Q 20/3415* (2013.01); *G06Q 20/352* (2013.01); *G06Q 20/36* (2013.01); *G06Q 20/3672* (2013.01); *G06Q 20/40* (2013.01); *G06Q 20/4012* (2013.01); *G06Q 20/40145* (2013.01); *G07F 7/0826* (2013.01); *G07F 7/0846* (2013.01); *G07F 7/0853* (2013.01); *G07F 7/0886* (2013.01); *G07F 7/1008* (2013.01); *H04M 1/0202* (2013.01); *H04M 1/0214* (2013.01); *H04M 1/185* (2013.01); *H04M 1/72412* (2021.01)

(56) References Cited

U.S. PATENT DOCUMENTS

| | | | |
|---|---|---|---|
| 2013/0282585 | A1 | 10/2013 | Walls et al. |
| 2014/0159869 | A1* | 6/2014 | Zumsteg ................ G07G 1/009 340/10.1 |
| 2014/0214665 | A1 | 7/2014 | Lee et al. |
| 2014/0279546 | A1* | 9/2014 | Poole ..................... G06Q 20/40 705/44 |
| 2014/0365370 | A1* | 12/2014 | Huang ................... G06Q 20/40 705/44 |

FOREIGN PATENT DOCUMENTS

| | | |
|---|---|---|
| KR | 10-2006-0035994 A | 4/2006 |
| KR | 10-2011-0116937 A | 10/2011 |
| KR | 10-2014-0097832 A | 8/2014 |

\* cited by examiner

FIG. 1
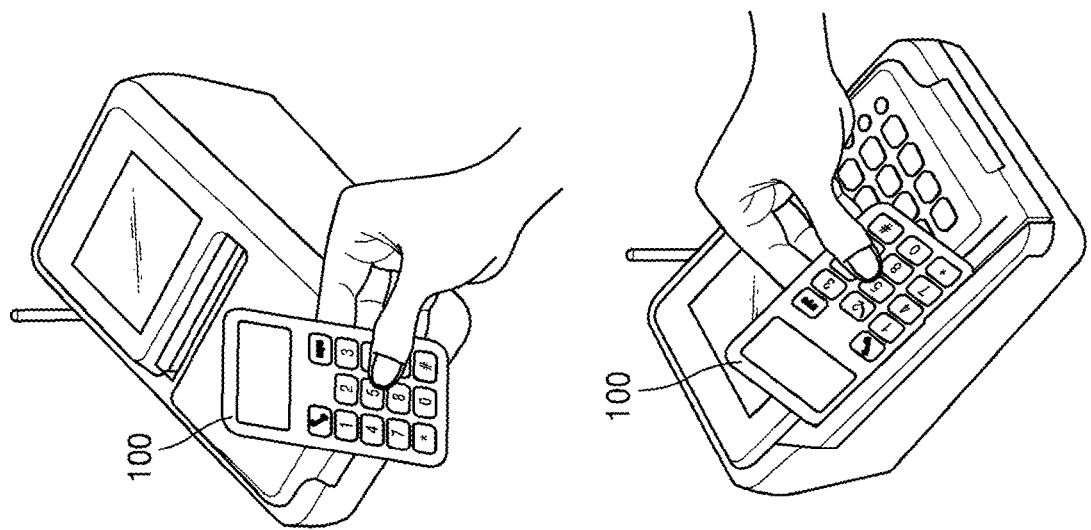
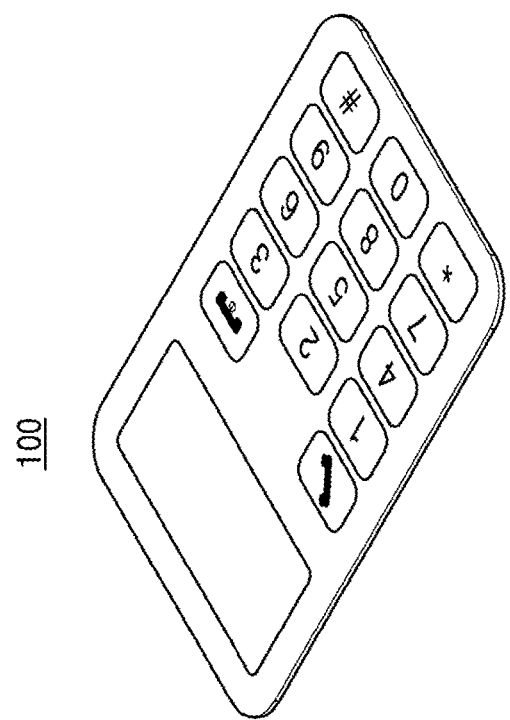

FIG. 9
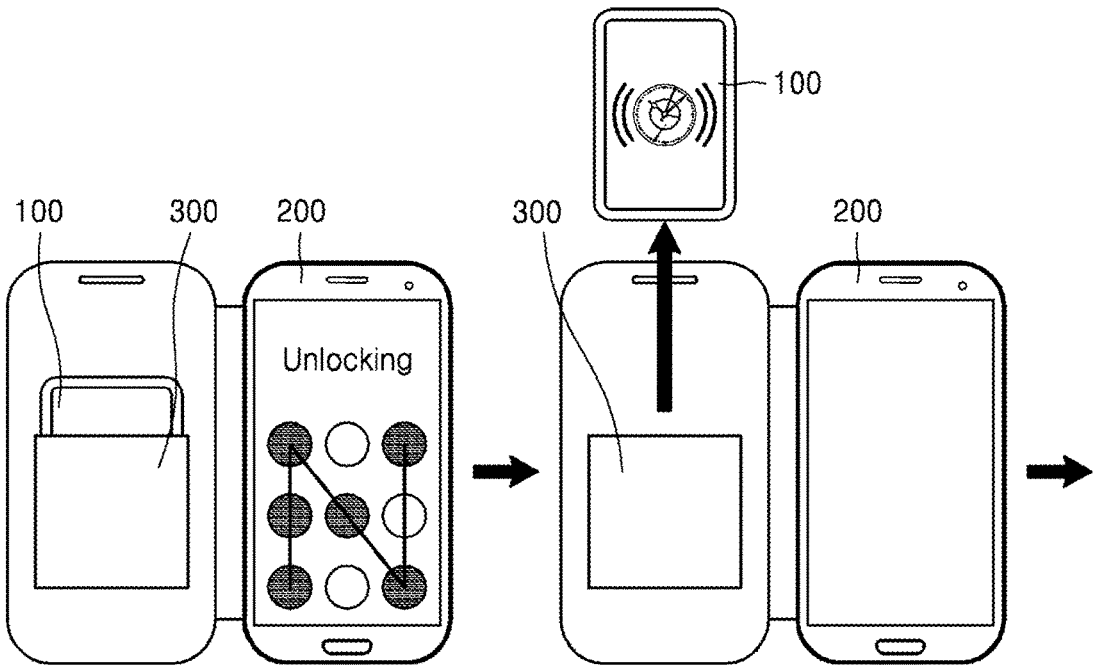
(A) UNLOCK SECOND MOBILE DEVICE
(B) DETACH FIRST MOBILE DEVICE
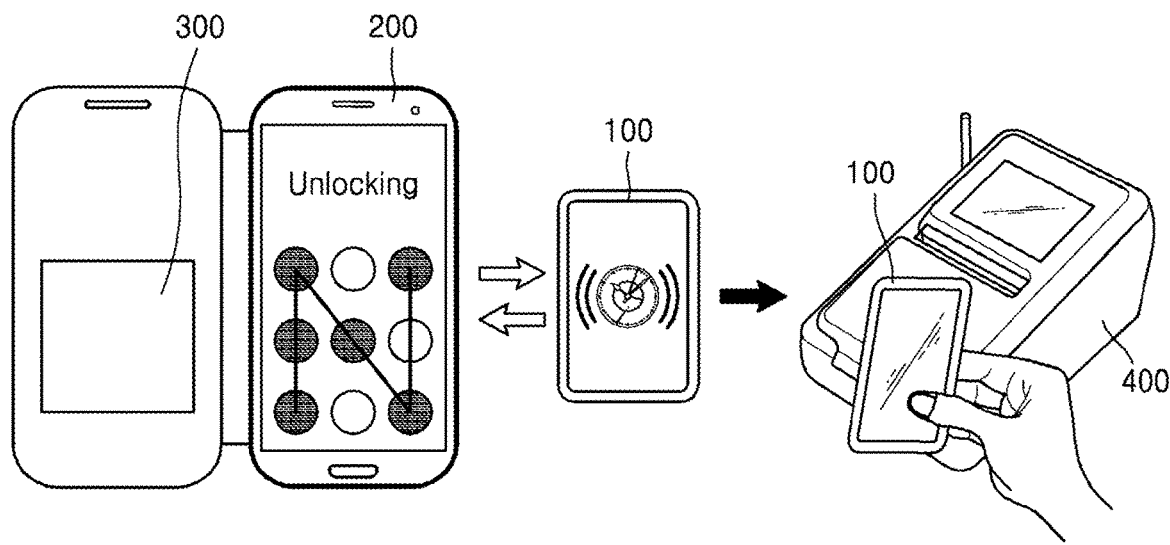
(C) PROVIDE NOTIFICATION INDICATING SECOND MOBILE DEVICE IS UNLOCKED, DETERMINE THE AMOUNT OF TIME ELAPSED AFTER FIRST MOBILE DEVICE IS DETACHED
(D) PERFORM PAYMENT

CARD-TYPE DEVICE AND PAYMENT METHOD

TECHNICAL FIELD

The present disclosure relates to a card-shaped device and a payment method using the same, and more particularly, to a device that is card shaped and able to perform a card payment, and a control method of the device.

BACKGROUND ART

Since various devices including a mobile terminal provide complex and various functions, devices of various shapes are being developed.

Recently, new paradigm devices such as wearable devices that did not previously exist are being introduced, and consumers who already have smartphones want to additionally purchase and to own the new paradigm devices.

Therefore, there is a high demand for new types of devices or new paradigm devices which can be used with conventional smartphones, tablet devices, etc. so as to provide more convenient usability.

DISCLOSURE

Technical Problem

Provided are a device that is card shaped and able to perform a card payment, and a payment method using the same.

Additional aspects will be set forth in part in the description which follows and, in part, will be apparent from the description, or may be learned by practice of the presented exemplary embodiments.

Technical Solution

According to an aspect of an exemplary embodiment, a first mobile device having a card shape includes a storage unit configured to store one or more pieces of card payment information; a payment information transmission unit configured to transmit at least one of the one or more pieces of card payment information in a contact or contactless manner to a payment terminal; and a controller configured to determine whether the first mobile device is in a detached state with respect to a second mobile device or a cover of the second mobile device, and to determine whether to transmit the at least one of the one or more pieces of card payment information, based on the determination of whether the first mobile device is in the detached state.

DESCRIPTION OF DRAWINGS

FIG. 1 is a conceptual diagram illustrating a first mobile device, according to an exemplary embodiment;

FIGS. 8 and 9 illustrate examples in which a card payment is performed without user authentication;

BEST MODE

Figure 2:
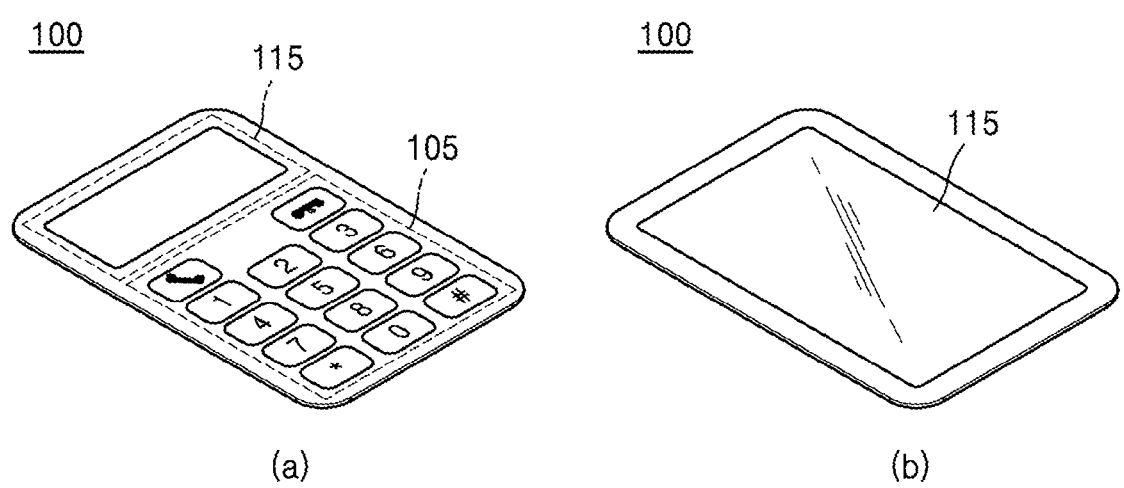
FIGS. 2 and 3 illustrate examples of shapes and applicable uses of the first mobile device, according to exemplary embodiments.

According to an aspect of an exemplary embodiment, a first mobile device having a card shape includes a storage unit configured to store one or more pieces of card payment information; a payment information transmission unit configured to transmit at least one of the one or more pieces of card payment information in a contact or contactless manner to a payment terminal; and a controller configured to determine whether the first mobile device is in a detached state with respect to a second mobile device or a cover of the second mobile device, and to determine whether to transmit the at least one of the one or more pieces of card payment information, based on the determination of whether the first mobile device is in the detached state.

The first mobile device may further include a communication unit configured to communicate with the second mobile device, the controller may be further configured to transmit, according to an execution request of a payment application, a signal to the second mobile device by using the communication unit, and if the controller receives a response signal from the second mobile device in response to the transmitted signal, the controller may be further configured to determine that the first mobile device is in the detached state but within a predetermined communication range of the second mobile device.

The first mobile device may further include a sensing unit configured to sense whether the first mobile device is in contact with the cover of the second mobile device, and, when the sensing unit senses that the first mobile device is not in contact with the cover of the second mobile device, the controller may be further configured to determine that the first mobile device is in the detached state.

The controller may be further configured to determine that the first mobile device is in the detached state with respect to the second mobile device or the cover of the second mobile device, and according to an elapsed time period after the detached state, the controller may be further configured to determine whether to perform user authentication for transmission of the at least one of the one or more pieces of card payment information.

When a preset amount of time elapses after the detached state, the controller may be further configured to perform the user authentication for transmission of the at least one of the one or more pieces of card payment information.

Authentication information used in the user authentication may include at least one of preset numeric password information, fingerprint information, and iris information.

The first mobile device may further include a communication unit configured to communicate with the second mobile device, and the controller may be further configured to receive the authentication information used in the user authentication, from the second mobile device, by using the communication unit.

The controller may be further configured to determine that the first mobile device is in the detached state with respect to the second mobile device or the cover of the second mobile device, and according to an elapsed time period after the detached state, the controller may be further configured to determine whether to block transmission of the at least one of the one or more pieces of card payment information.

The first mobile device may further include a communication unit configured to communicate with the second mobile device, and, when a preset amount of time elapses after the detached state, the controller may be further configured to transmit a signal to the second mobile device by using the communication unit, and if the controller does not receive a response signal responding to the transmitted signal from the second mobile device, the controller may be further configured to block transmission of the at least one of the one or more pieces of card payment information.

The first mobile device may further include a communication unit configured to communicate with the second mobile device, the controller may be further configured to transmit a signal to the second mobile device by using the communication unit at regular intervals after the first mobile device is detached from the second mobile device or the cover, and if the controller does not receive a response signal responding to the transmitted signal from the second mobile device, the controller may be further configured to block transmission of the at least one of the one or more pieces of card payment information.

The first mobile device may further include a communication unit configured to communicate with the second mobile device, and the controller may be further configured to receive the one or more pieces of card payment information from the second mobile device by using the communication unit.

The controller may be further configured to select at least one piece of card payment information from among the one or more pieces of card payment information and to transmit the at least one selected piece of card payment information, wherein the at least one selected piece of card payment information corresponds to a payment situation.

The first mobile device may further include a position sensor configured to determine location information of the first mobile device, and the payment situation may include at least one of the location information of the first mobile device, time information, and payment discount information.

According to an aspect of another exemplary embodiment, a payment method, which is performed by a first mobile device having a card shape, includes determining whether the first mobile device is in a detached state with respect to a second mobile device or a cover of the second mobile device; and determining whether to transmit card payment information, based on the determination of whether the first mobile device is in the detached state.

The determining of whether the first mobile device is in the detached state may include transmitting a signal to the second mobile device, according to an execution request of a payment application, and if a response signal responding to the transmitted signal is received, the determining of whether the first mobile device is in the detached state may include determining whether the first mobile device is in the detached state but within a predetermined communication range of the second mobile device.

The determining of whether the first mobile device is in the detached state may include sensing whether the first mobile device is in contact with the cover of the second mobile device, and if the first mobile device is not in contact with the cover of the second mobile device, determining that the first mobile device is in the detached state.

The determining of whether to transmit the at least one of the one or more pieces of card payment information may include determining whether to perform user authentication for transmission of the at least one of the one or more pieces of card payment information, according to an elapsed time period after the detached state.

When a preset amount of time elapses after the detached state, the determining of whether to transmit the at least one of the one or more pieces of card payment information may include performing the user authentication for transmission of the at least one of the one or more pieces of card payment information.

Authentication information used in the user authentication may include at least one of preset numeric password information, fingerprint information, and iris information.

The authentication information used in the user authentication may be received from the second mobile device.

The determining of whether to transmit the at least one of the one or more pieces of card payment information may include determining whether to block transmission of the at least one of the one or more pieces of card payment information, according to an elapsed time period after the detached state.

When a preset amount of time elapses after the detached state, the determining of whether to transmit the at least one of the one or more pieces of card payment information may include transmitting a signal to the second mobile device, and if a response signal responding to the transmitted signal is not received, the determining of whether to transmit the at least one of the one or more pieces of card payment information may include blocking transmission of the at least one of the one or more pieces of card payment information.

The determining of whether to transmit the at least one of the one or more pieces of card payment information may include transmitting a signal to the second mobile device at regular intervals according to an elapsed time period after the detached state, and if a response signal responding to the transmitted signal is not received, the determining of whether to transmit the at least one of the one or more pieces of card payment information may include blocking transmission of the at least one of the one or more pieces of card payment information.

The payment method may further include receiving one or more pieces of the card payment information from the second mobile device.

The determining of whether to transmit the at least one of the one or more pieces of card payment information may include selecting at least one piece of card payment information from among the one or more pieces of card payment information and transmitting the at least one selected piece of card payment information, wherein the at least one selected piece of card payment information corresponds to a payment situation.

The payment situation may include at least one of location information of the first mobile device, time information, and payment discount information.

Mode for Invention

One or more exemplary embodiments will now be described more fully with reference to the accompanying drawings. The inventive concept may, however, be embodied in many different forms and should not be construed as being limited to the embodiments set forth herein; rather, these embodiments are provided so that this disclosure will be thorough and complete, and will fully convey the inventive concept to those of ordinary skill in the art. In the following description, well-known functions or constructions are not described in detail since they would obscure the inventive concept with unnecessary detail. Throughout the specification, like reference numerals in the drawings denote like elements.

Reference will now be made in detail to exemplary embodiments, examples of which are illustrated in the accompanying drawings. In this regard, the present exemplary embodiments may have different forms and should not be construed as being limited to the descriptions set forth herein. Accordingly, the exemplary embodiments are merely described below, by referring to the figures, to explain aspects of the inventive concept. Throughout the specification, like reference numerals refer to like elements. In the following description, well-known functions or constructions are not described in detail since they would obscure the invention with unnecessary detail. Also, while terms "first" and "second" are used to describe various components, it is obvious that the components are not limited to the terms "first" and "second". The terms "first" and "second" are used only to distinguish between each component.

Hereinafter, a device related to one or more exemplary embodiments is described in detail with reference to drawings. In the following description, terms such as "module" and "unit" that are used for elements do not have their own meanings or functions.

Throughout the specification, a device may include a mobile phone, a smartphone, a tablet personal computer (PC), a laptop computer, a terminal for digital broadcasting, a personal digital assistant (PDA), a portable multimedia player (PMP), navigation, etc.

Throughout the specification, it will also be understood that when an element is referred to as being "connected to" or "coupled with" another element, it can be directly connected to or coupled with the other element, or it can be electrically connected to or coupled with the other element by having an intervening element interposed therebetween. Also, when a part "includes" or "comprises" an element, unless there is a particular description contrary thereto, the part can further include other elements, not excluding the other elements.

As used herein, the term "and/or" includes any and all combinations of one or more of the associated listed items. Expressions such as "at least one of," when preceding a list of elements, modify the entire list of elements and do not modify the individual elements of the list.

Hereinafter, the one or more exemplary embodiments will now be described in detail with reference to the accompanying drawings.

FIG. 1 is a conceptual diagram illustrating a first mobile device 100, according to an exemplary embodiment.

The first mobile device 100 (also referred to as 'the device 100' or 'the card-shaped first mobile device 100' according to the present exemplary embodiment may be a card-shaped device.

The card-shaped first mobile device 100 may mean a mobile device having an ultra-slim or ultra-thin exterior shape such as a general credit card, a transportation card, etc.

As illustrated in FIG. 1, the first mobile device 100 may provide the same payment functions and usability as those of a general credit card. For example, when the first mobile device 100 contacts a payment terminal (e.g., a point of sales (POS) terminal), the payment function may be performed. When the first mobile device 100 approaches and is within a predetermined distance from the payment terminal, the payment function may be performed via near field communication (NFC). When the first mobile device 100 approaches and is within a predetermined distance from the payment terminal, the payment function may be performed in a manner that card payment information stored in the first mobile device 100 is transmitted to the payment terminal via a magnetic field, and one or more exemplary embodiments are not limited thereto.

According to the present exemplary embodiment, a user does not need to carry several plastic credit cards, and by using the first mobile device 100 storing a plurality of pieces of card payment information as when using an actual plastic credit card, the user may conveniently perform a credit card payment.

Since the first mobile device 100 may have only ultra-small modules embedded therein so as to have an ultra-slim shape, the first mobile device 100 may be embodied to perform only some functions from among various functions provided by general smartphones, but the one or more exemplary embodiments are not limited thereto. For example, the first mobile device 100 may have a phone number assigned thereto, and thus may perform a call function to communicate with another smartphone via a mobile communication system.

Figure 3:
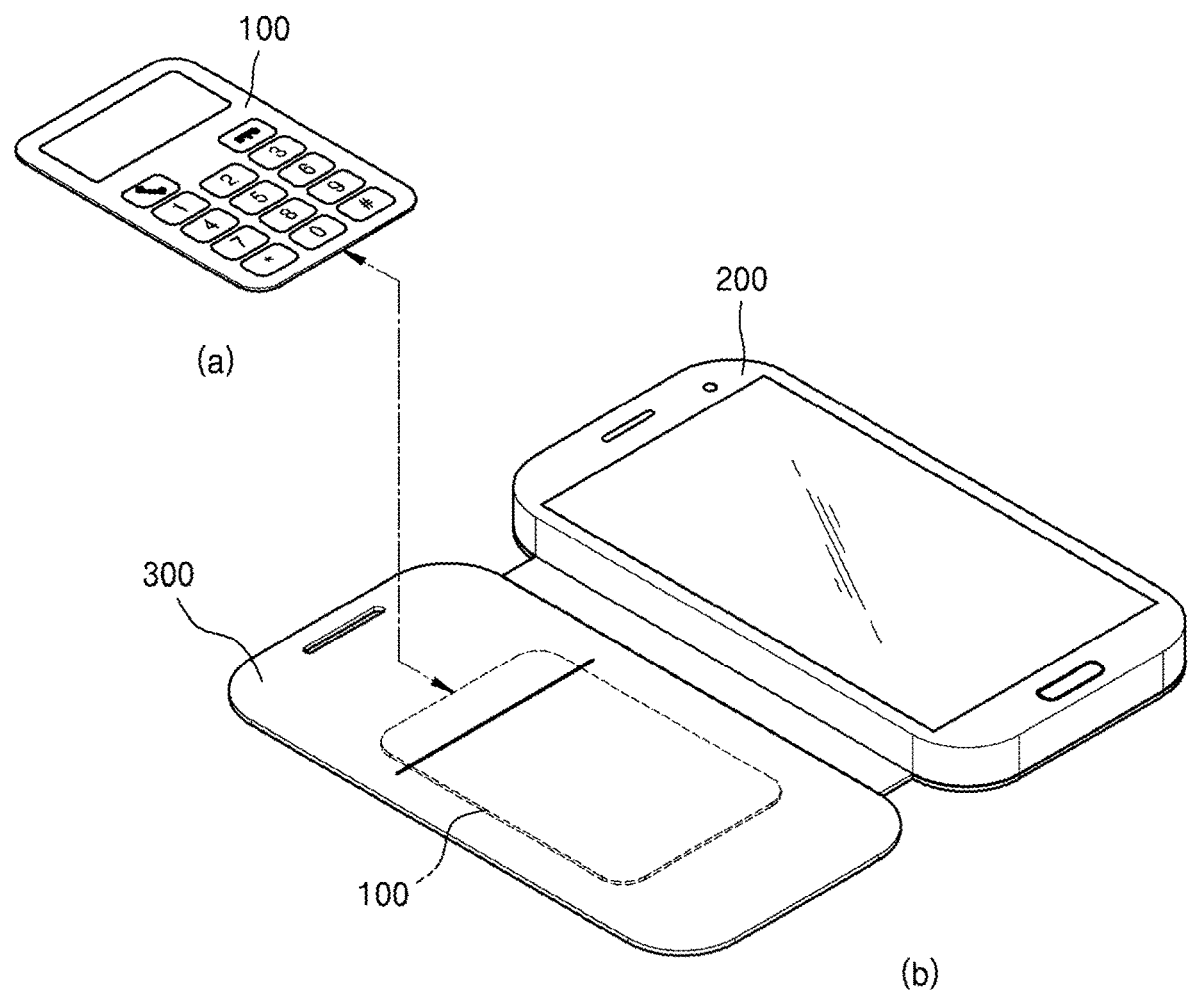

FIGS. 2 and 3 illustrate examples of shapes and applicable uses of the first mobile device 100, according to exemplary embodiments.

Referring to FIG. 2, the card-shaped first mobile device 100 may also be variously shaped. For example, as illustrated in (a) of FIG. 2, the first mobile device 100 may have a display unit 115 and a user input unit 105 formed on a front surface thereof. Referring to (b) of FIG. 2, the first mobile device 100 may be embodied to have the display unit 115 formed on the entire surface thereof, and one or more exemplary embodiments are not limited thereto.

FIG. 3 illustrates an example in which the card-shaped first mobile device 100 is detachable with respect to a cover 300 of a second mobile device 200.

The first mobile device 100 may include a sensing unit 140 that senses contact with the cover 300 of the second mobile device 200, and thus may sense whether the first mobile device 100 is combined with or detached from the cover 300 of the second mobile device 200.

As illustrated in (b) of FIG. 3, the first mobile device 100 may be combined with the cover 300 of the second mobile device 200 by being inserted into a holding part included in the cover 300. For example, while the first mobile device 100 is combined with the cover 300, the first mobile device 100 may exchange predefined data with the second mobile device 200 via a cable embedded in the cover 300.

The first mobile device 100 may exchange predefined data with the second mobile device 200 via NFC.

Figure 4:
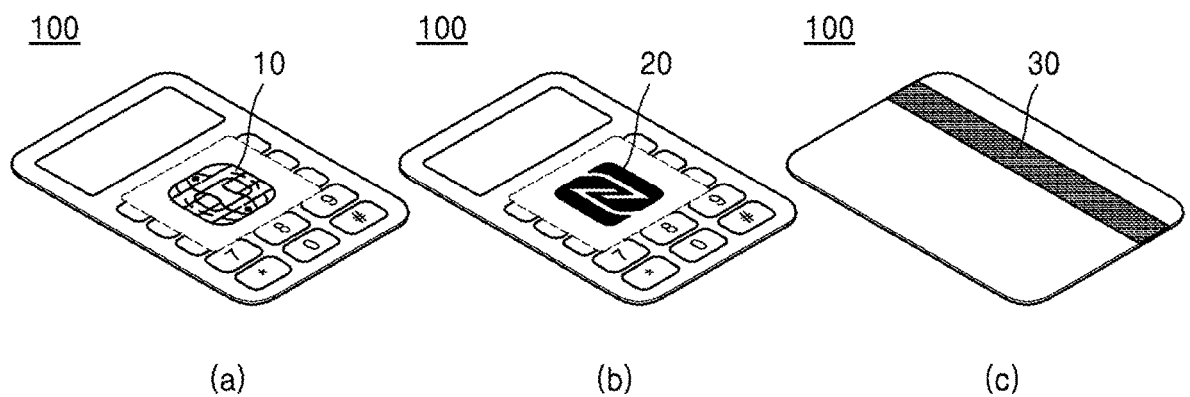
FIG. 4 illustrates card payment functions of the card-shaped first mobile device, according to an exemplary embodiment.

FIG. 4 illustrates card payment functions of the card-shaped first mobile device 100, according to an exemplary embodiment.

Referring to (a) of FIG. 4, the card-shaped first mobile device 100 may have embedded therein an integrated circuit (IC) chip to which card payment information may be recorded, and may provide the same usability as that of an IC card. The first mobile device 100 having the IC chip embedded therein may provide a contact-type payment function, or may have a wireless communication module embedded therein and thus may provide a contactless payment function.

Referring to (b) of FIG. 4, the first mobile device 100 may provide the contactless payment function by using an NFC function for wirelessly exchanging data within a short distance of about 10 cm.

Referring to (c) of FIG. 4, in order to provide the same usability as that of a magnetic card that is sensed by a POS payment terminal so as to transmit payment information, the first mobile device 100 may have a magnetic stripe capable of recording and transferring predefined data, but one or more exemplary embodiments are not limited thereto.

Figure 5:
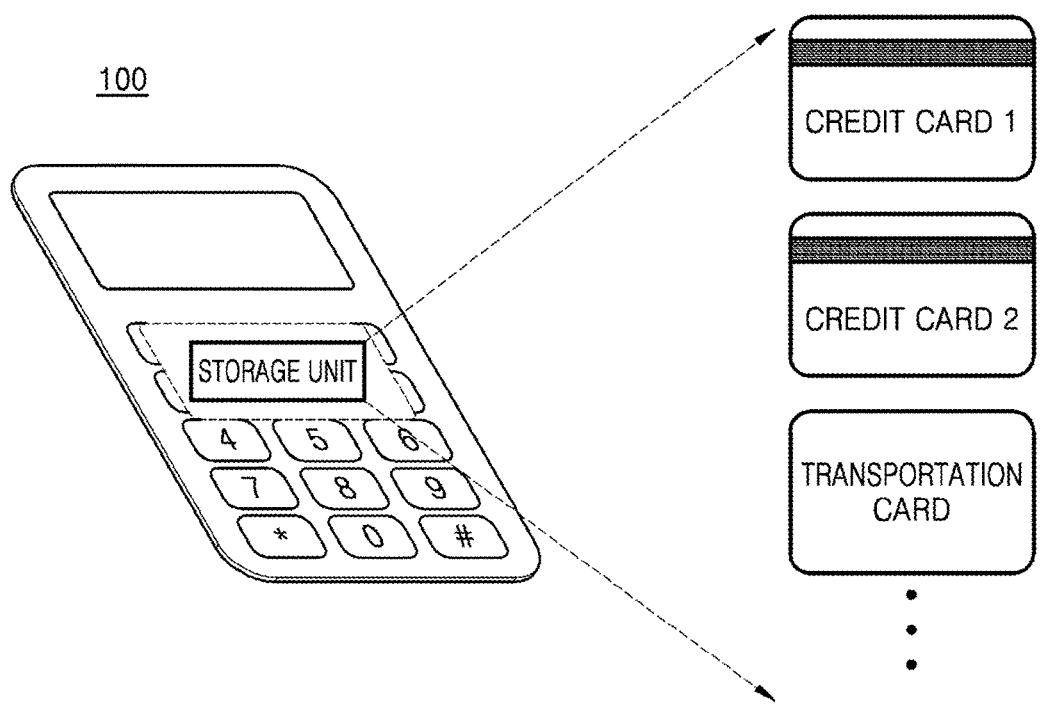
FIG. 5 illustrates a device that stores a plurality of pieces of card payment information, according to an exemplary embodiment.

FIG. 5 illustrates the device 100 that stores a plurality of pieces of card payment information, according to an exemplary embodiment.

As illustrated in FIG. 5, a storage unit 190 of the device 100 may store the plurality of pieces of card payment information.

The card payment information may mean information required for credit card payment, and may include a credit card number, credit card company information, user information, credit card validity period information, a credit card numeric password, or the like.

A user does not need to carry a plurality of plastic cards, and may perform a card payment by using the device 100 storing a plurality of pieces of credit card payment information, transportation card information, or the like.

The first mobile device 100 may be used while interoperating with a second mobile device 200 such as a smartphone. The first mobile device 100 may receive a plurality of pieces of card payment information from the second mobile device 200 and may store them.

Figure 6:
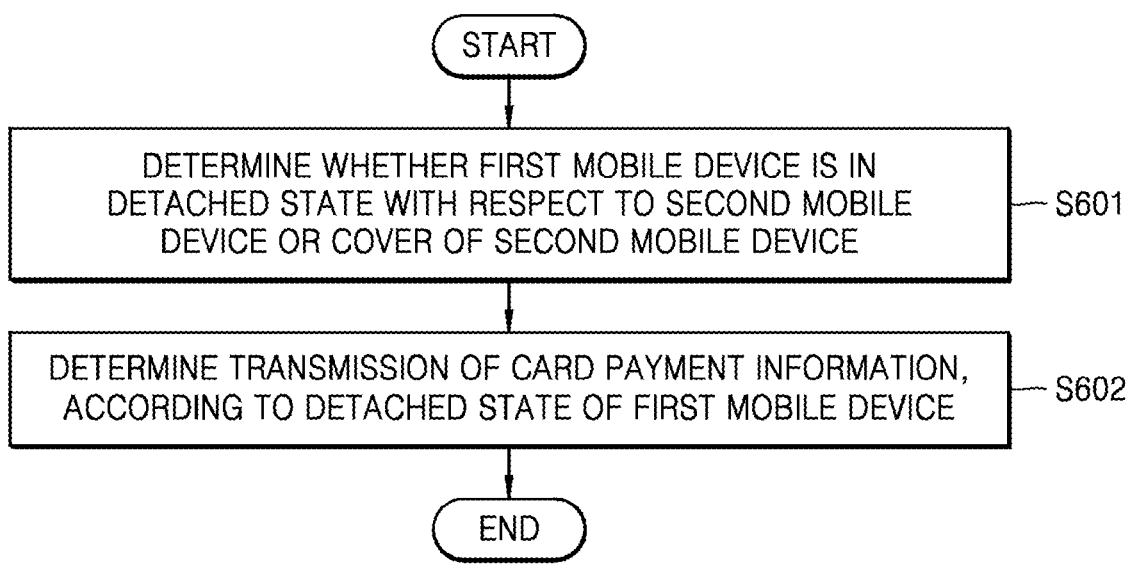
FIG. 6 illustrates a flowchart of a control method of the card-shaped first mobile device, according to an exemplary embodiment.

FIG. 6 illustrates a flowchart of a control method of the card-shaped first mobile device 100, according to an exemplary embodiment.

According to the present exemplary embodiment, the card-shaped first mobile device 100 may be used together with the second mobile device 200 (e.g. a smartphone) that interoperates with the first mobile device 100, or may be detached from the second mobile device 200 and may independently perform a card payment function. The first mobile device 100 according to the present exemplary embodiment may determine whether to perform a payment, by taking into account factors such as the time elapsed after the first mobile device 100 was detached from the second mobile device 200, a distance between the first mobile device 100 and the second mobile device 200, etc.

For example, in a case where a large amount of time has passed since the first mobile device 100 was detached from the second mobile device 200, or the first mobile device 100 is more than a predetermined distance from the second mobile device 200, the first mobile device 100 may have been lost, and thus, the first mobile device 100 may require user authentication prior to performing a card payment or may block transmission of card payment information.

Referring to FIG. 6, in operation S601, a controller 180 of the first mobile device 100 may determine whether the first mobile device 100 is in a detached state with respect to the second mobile device 200 or the cover 300 of the second mobile device 200.

The controller 180 of the first mobile device 100 may communicate with the second mobile device 200 and thus may determine that the first mobile device 100 is in a detached state within a predefined distance range from the second mobile device 200.

In the present exemplary embodiment, when a payment application is executed, in order to determine whether the first mobile device 100 is detached from second mobile device 200, the first mobile device 100 may transmit a predefined signal to the second mobile device 200, and may determine that the first mobile device 100 is located within a predetermined distance from the second mobile device 200, based on a strength of a response signal, a time required for receiving the response signal, etc.

By using the sensing unit 140 that senses whether the first mobile device 100 contacts the holding part included in the cover 300 of the second mobile device 200, when the first mobile device 100 senses that the first mobile device 100 is not combined with the cover 300 of the second mobile device 200, the first mobile device 100 may determine that the first mobile device 100 is currently detached from the second mobile device 200.

In operation S602 of FIG. 6, the controller 180 of the first mobile device 100 may determine transmission of the card payment information, according to the detached state.

According to the detached state between the first mobile device 100 and the second mobile device 200, e.g., according to whether a predefined time period elapsed after the detachment, the controller 180 may determine whether to perform the user authentication in transmission of the card payment information, whether to block a card payment, or the like.

Figure 7:
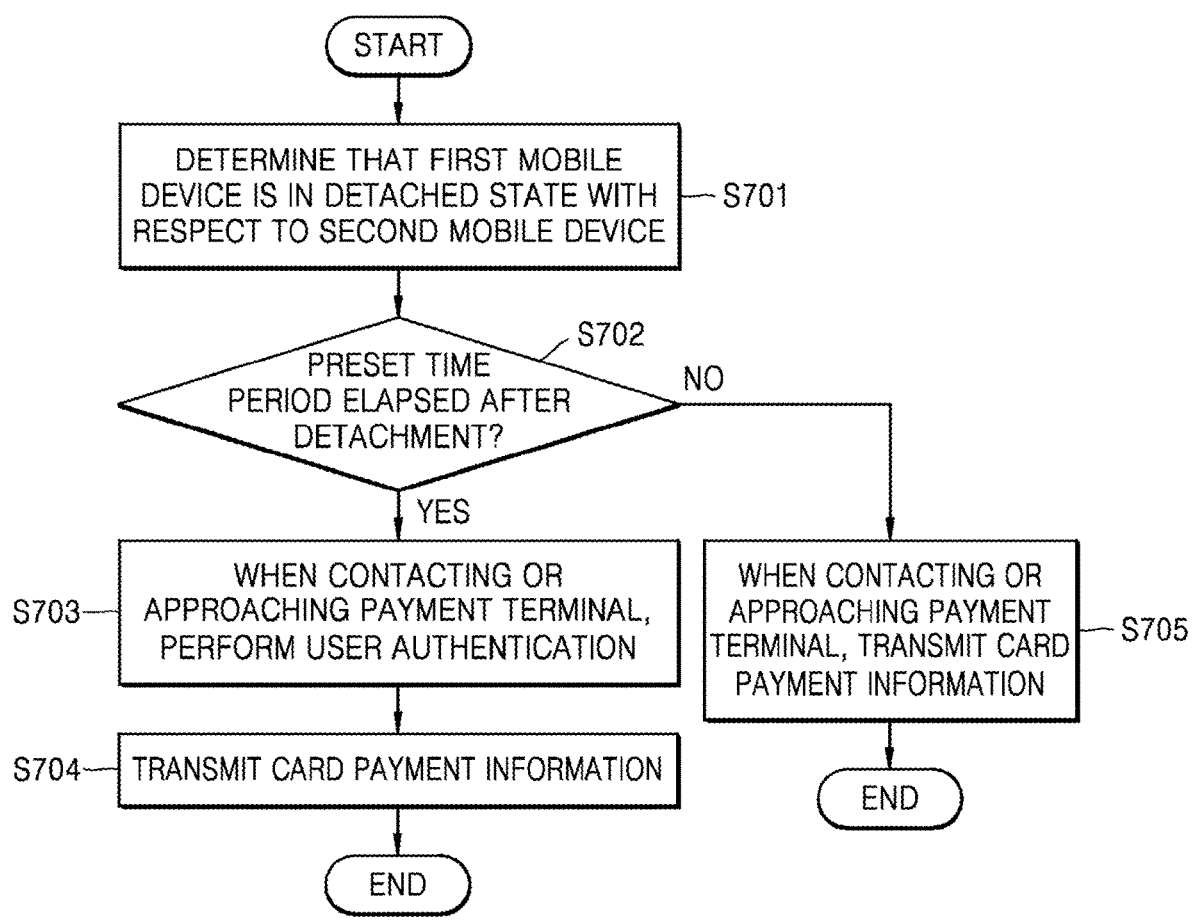
FIG. 7 illustrates a flowchart related to user authentication by the card-shaped first mobile device, according to an exemplary embodiment.

FIG. 7 illustrates a flowchart related to user authentication by the card-shaped first mobile device 100, according to an exemplary embodiment.

In operation S701 of FIG. 7, the first mobile device 100 may determine that the first mobile device 100 is in a detached state with respect to the second mobile device 200 or the cover 300 of the second mobile device 200. The first mobile device 100 may determine, by using the sensing unit 140, a physical contact with the cover 300 of the second mobile device 200, or may determine the detached state via communication with the second mobile device 200.

In operation S702 of FIG. 7, the first mobile device 100 may determine whether a preset time period elapsed after the first mobile device 100 was detached from the second mobile device 200 or the cover 300 of the second mobile device 200. In operation S703, if the first mobile device 100 determines that the preset time period elapsed, when the first mobile device 100 contacts or approaches a payment terminal so as to perform a card payment, the first mobile device 100 may perform user authentication. In operation S704, the first mobile device 100 may transmit card payment information to the payment terminal so as to perform the card payment.

For example, if the preset time period elapsed after the first mobile device 100 was separated, the first mobile device 100 may perform the user authentication before the first mobile device 100 transmits the card payment information.

The first mobile device 100 may receive an input of user authentication information such as a numeric password, fingerprint information, iris information, or the like. The first mobile device 100 may receive the user authentication information from the second mobile device 200 that interoperates with the first mobile device 100.

In operation S705, if the first mobile device 100 determines that the preset time period did not elapse after the first mobile device 100 was detached from the second mobile device 200 or the cover 300 of the second mobile device 200, the first mobile device 100 may transmit the card payment information to the payment terminal without performing the user authentication.

Figure 8:
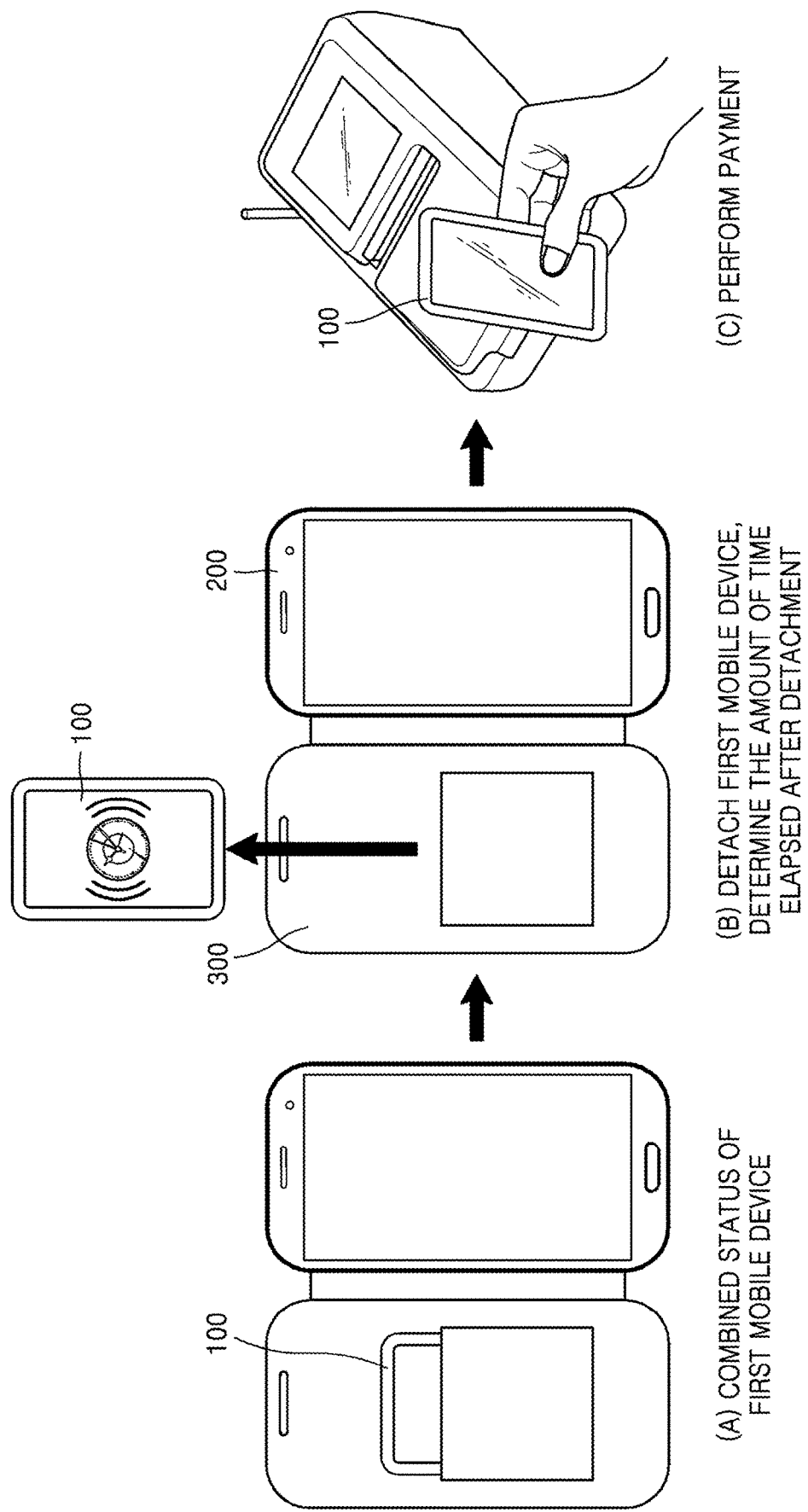

FIGS. 8 and 9 illustrate examples in which a card payment is performed without user authentication.

FIGS. 8 and 9 illustrate the examples in which, when the first mobile device 100 performs a card payment within a preset time period after the first mobile device 100 is detached from the cover 300 of the second mobile device 200, the first mobile device 100 performs the card payment without performing the user authentication.

The first mobile device 100 according to the present exemplary embodiment may easily and conveniently perform a card payment without the user authentication while the first mobile device 100 provides usability as that of an actual credit card.

Referring to (a) and (b) of FIG. 8, when the first mobile device 100 is detached from the cover 300 of the second mobile device 200, the first mobile device 100 may determine the amount of time which has elapsed after the detachment.

As illustrated in (c) of FIG. 8, when the first mobile device 100 contacts or approaches a payment terminal 400 within a preset time period after the first mobile device 100 was detached from the second mobile device 200, the first mobile device 100 may not perform the user authentication and may perform the card payment.

Referring to FIG. 9, since the first mobile device 100 previously receives brief user authentication information (e.g., a user input for an unlocking a lock screen of the second mobile device 200 has been completed) from the second mobile device 200 that interoperates with the first mobile device 100, the first mobile device 100 may skip the user authentication.

Since the first mobile device 100 according to the present exemplary embodiment previously receives the user authentication information from t the second mobile device 200, the first mobile device 100 may maintain security and may also provide fast and convenient usability since the first mobile device 100 does not perform separate user authentication for the card payment.

Referring to (a) of FIG. 9, the second mobile device 200 may receive a user input of unlocking a screen lock. Referring to (b) and (c) of FIG. 9, when the first mobile device 100 is detached from the second mobile device 200, the second mobile device 200 may transmit, to the first mobile device 100, a signal for notifying about completion of user authentication (e.g., the screen lock is unlocked).

When the first mobile device 100 is detached from the cover 300 of the second mobile device 200, the first mobile device 100 may determine the amount of time which has elapsed after the detachment.

As illustrated in (d) of FIG. 9, when the first mobile device 100 attempts to perform a card payment in a contact or contactless manner with the payment terminal 400 within a preset time period after the detachment, the first mobile device 100 may transmit card payment information without performing the user authentication.

Figure 10:
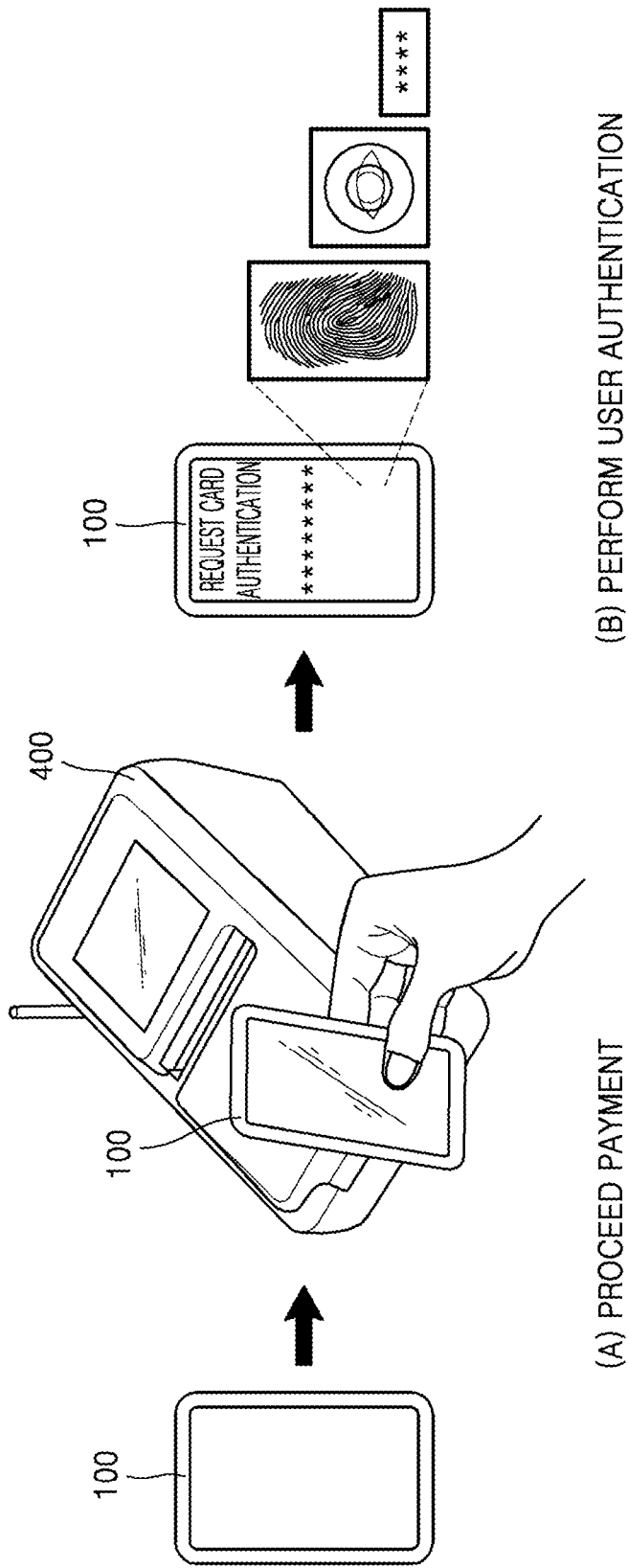
FIGS. 10 and 11 illustrate examples in which user authentication is performed.
Figure 11:
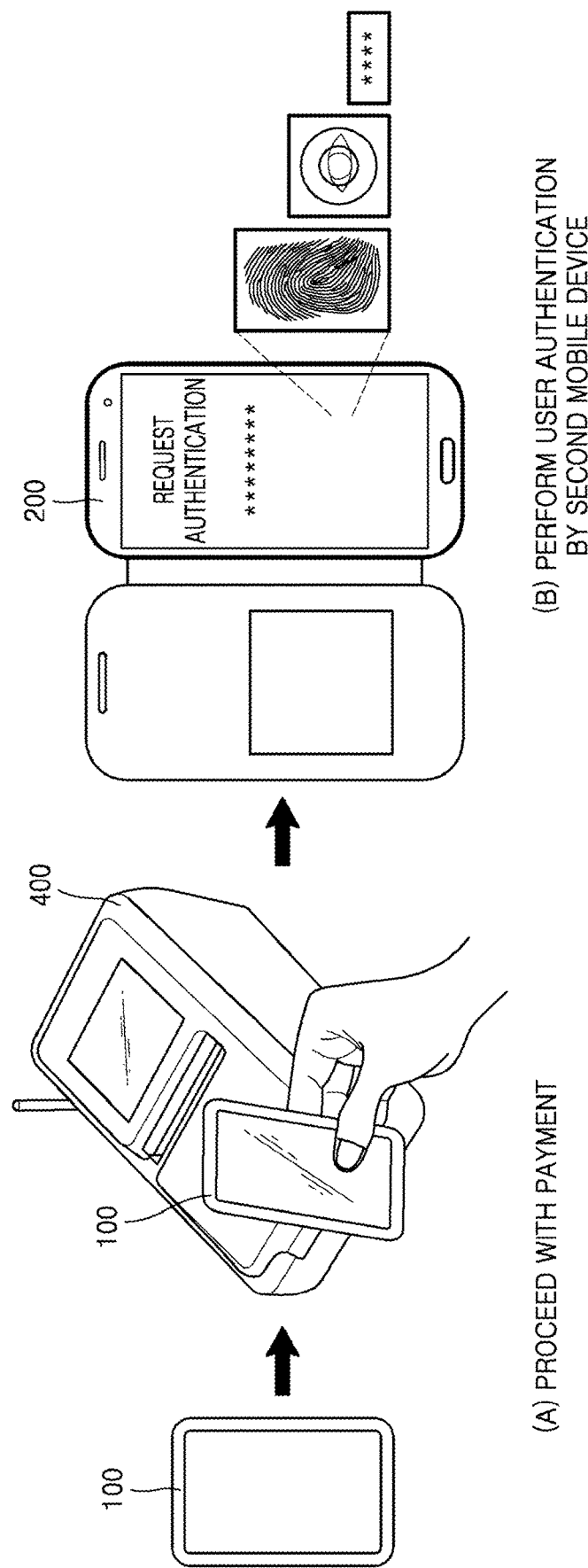

FIGS. 10 and 11 illustrate examples in which user authentication is performed.

Referring to FIG. 10, when the first mobile device 100 contacts or approaches the payment terminal 400 after an elapse of a preset time period after the first mobile device 100 was detached from the second mobile device 200, the first mobile device 100 may perform the user authentication.

The user authentication may be performed by using biological information via fingerprint recognition or iris recognition using a biological information recognition module included in the first mobile device 100. Alternatively, the user authentication may correspond to a password input, a preset pattern input, or the like.

Referring to FIG. 11, when the first mobile device 100 contacts or approaches the payment terminal 400 after the elapse of the preset time period after the first mobile device 100 was detached from the second mobile device 200, the first mobile device 100 may receive user authentication information from the second mobile device 200 that interoperates with the first mobile device 100.

For example, when the first mobile device 100 transmits, to the second mobile device 200, a signal for requesting the second mobile device 200 for the user authentication information, a display unit of the second mobile device 200 may display a user interface related to user authentication.

The second mobile device 200 may perform user authentication by using fingerprint recognition or iris recognition using a biological information recognition module included in the second mobile device 200, and may transmit the user authentication information to the first mobile device 100. Alternatively, the second mobile device 200 may perform the user authentication by using a preset numeric password input, a preset pattern input, or the like.

Figure 12:
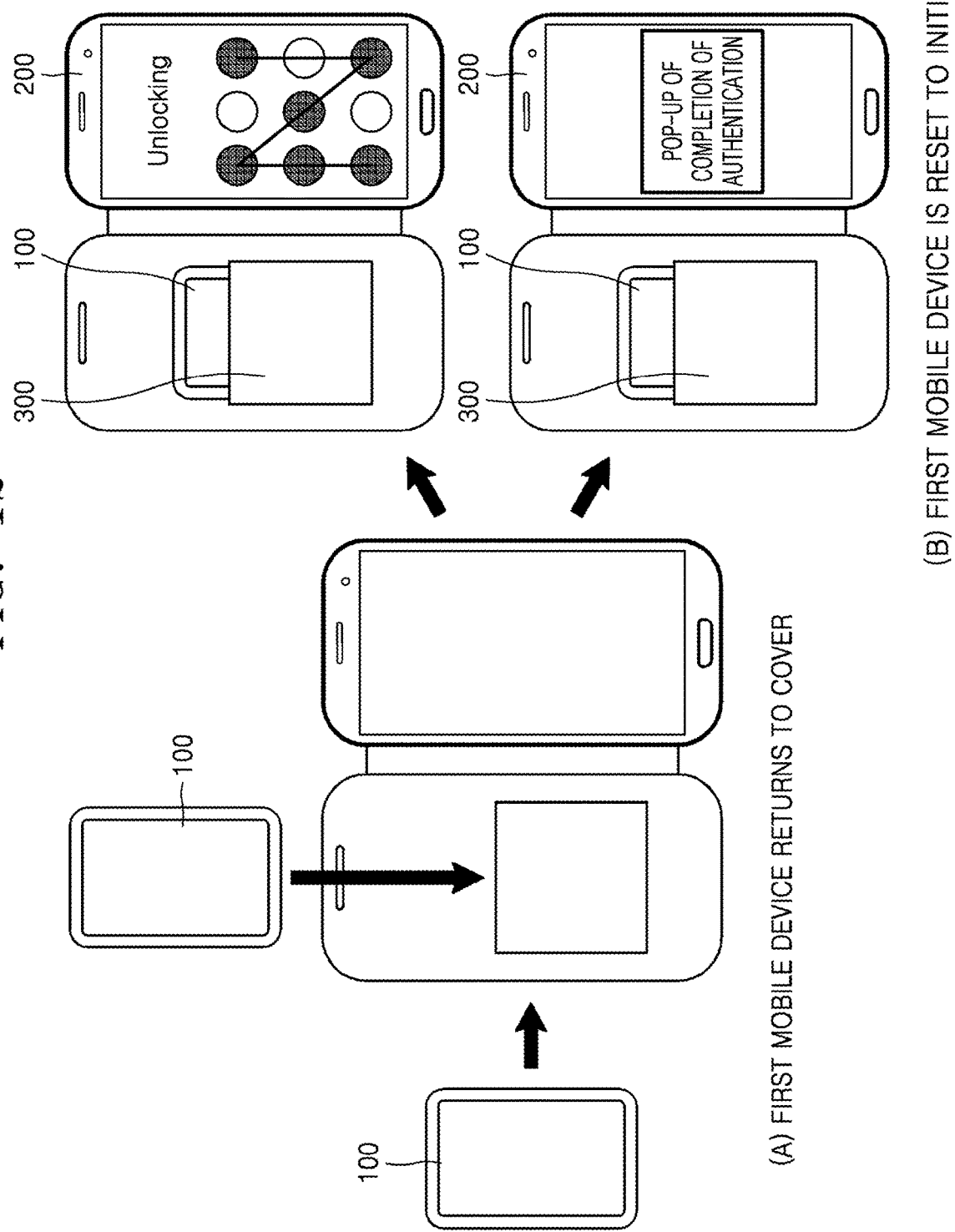
FIG. 12 illustrates an example in which a first mobile device is reattached to a cover.

FIG. 12 illustrates an example in which a first mobile device is reattached to a cover.

In the present exemplary embodiment, as described with reference to FIG. 7, when the first mobile device 100 has been detached from the cover 300 of the second mobile device 200 for a preset time period, the first mobile device 100 may be set as a status at which user authentication is required for a card payment.

According to the present exemplary embodiment, when the first mobile device 100 is returned to the cover 300, the first mobile device 100 may receive brief user authentication information (e.g., a user input for an unlocking a lock screen of the second mobile device 200 has been completed) from the second mobile device 200, and thus may be reset to an initial state, e.g., the time elapsed after the first mobile device 100 was detached from the cover 300 may be reset.

The second mobile device 200 may display, on the display unit, a user interface for requesting simple user authentication, and may perform the user authentication (e.g., a preset numeric password input, a reset pattern input, or the like by the second mobile device 200).

Figure 13:
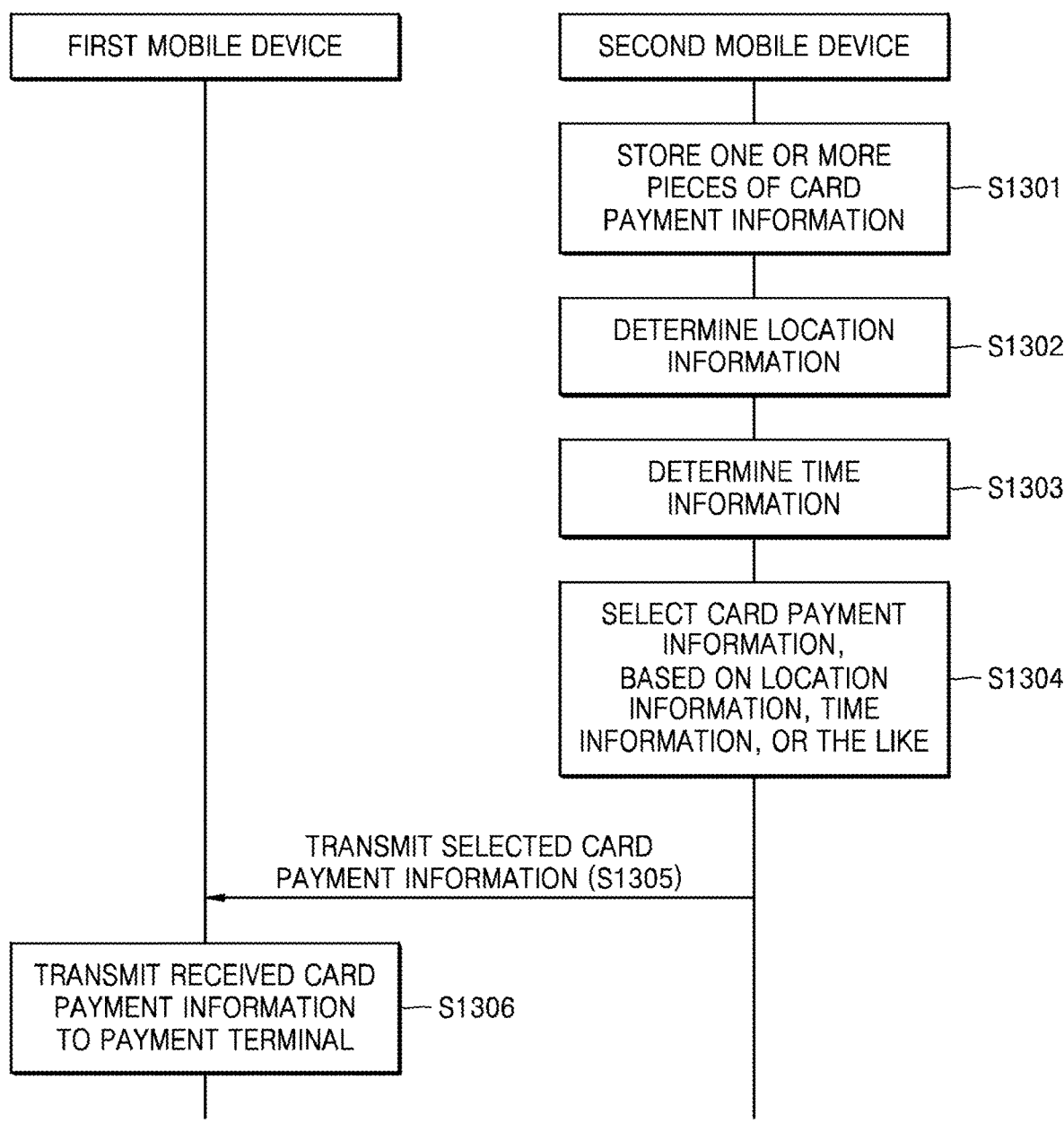
FIG. 13 illustrates a flowchart of an example in which a second mobile device selects and transmits card payment information to the first mobile device.

FIG. 13 illustrates a flowchart of an example in which the second mobile device 200 selects and transmits card payment information to the first mobile device 100.

According to the present exemplary embodiment, the second mobile device 200 may select, from among one or more pieces of card payment information, a piece of card payment information which is appropriate for a payment situation, and may provide the piece of card payment information to the first mobile device 100.

In operation S1301 of FIG. 13, the second mobile device 200 that interoperates with the first mobile device 100 may store one or more pieces of card payment information.

According to the present exemplary embodiment, the second mobile device 200 may receive, from a user, an input of card payment information including a card number, card company information, a numeric password, a card validity period, or the like, and may register the card payment information therein.

In operation S1302, the second mobile device 200 may determine location information.

The second mobile device 200 may determine indoor and outdoor locations of the second mobile device 200 by using a location sensor (not shown) of the second mobile device 200. For example, the location sensor of the second mobile device 200 may be a global positioning system (GPS) but is not limited thereto.

A controller (not shown) of the second mobile device 200 may determine the location information of the second mobile device 200 by using pedestrian dead reckoning (PDR) that is a technique of determining speed, a direction, or a distance of movement of a person by using sensors including an accelerometer, a gyroscope, a magnetometer, or the like.

The controller of the second mobile device 200 may determine a location of the second mobile device 200 of the user via a trilateration process or a triangulation process using sensors and communication units such as 3rd generation (3G), Long Term Evolution (LTE), a Global Navigation Satellite System (GNSS), a global system for mobile communication (GSM), Loran-C, Northwest European Loran-C System (NELS), a wireless local area network (WLAN), Bluetooth, or the like.

When the second mobile device 200 is located indoor, the controller of the second mobile device 200 may determine a location of the second mobile device 200 by using sensors and communication units including indoor-GPS, Bluetooth, WLAN, visual logic controller (VLC), an active badge, GSM, radio frequency identification (RFID), visual tags, a wireless intrusion prevention system (WIPS), WLAN, a ultrasound sensor, a geomagnetic sensor, or the like.

The method of obtaining the location information of the second mobile device 200 according to the present exemplary embodiment is not limited to the aforementioned examples, and other methods capable of obtaining the location information of the second mobile device 200 may be applied thereto.

In operation S1303, the second mobile device 200 may determine time information. According to the present exemplary embodiment, the second mobile device 200 may determine a time of a card payment.

In operation S1304, the second mobile device 200 may select the card payment information, based on the location information, the time information, or the like.

For example, when the user visits an S store, the second mobile device 200 may select card payment information corresponding to a card that offers a discount in the S store. Alternatively, the second mobile device 200 may select card payment information corresponding to a card that offers a discount when the user attempts to initiate a card payment during a predetermined time period.

In operation S1305, the second mobile device 200 may transmit the card payment information selected in operation S1304 to the first mobile device 100.

The second mobile device 200 may transmit the selected card payment information to the first mobile device 100 via NFC or via the cover 300 that contacts the first mobile device 100.

In operation S1306, in order to perform the card payment, the first mobile device 100 may transmit, to a payment terminal, the card payment information received from the second mobile device 200.

Figure 14:
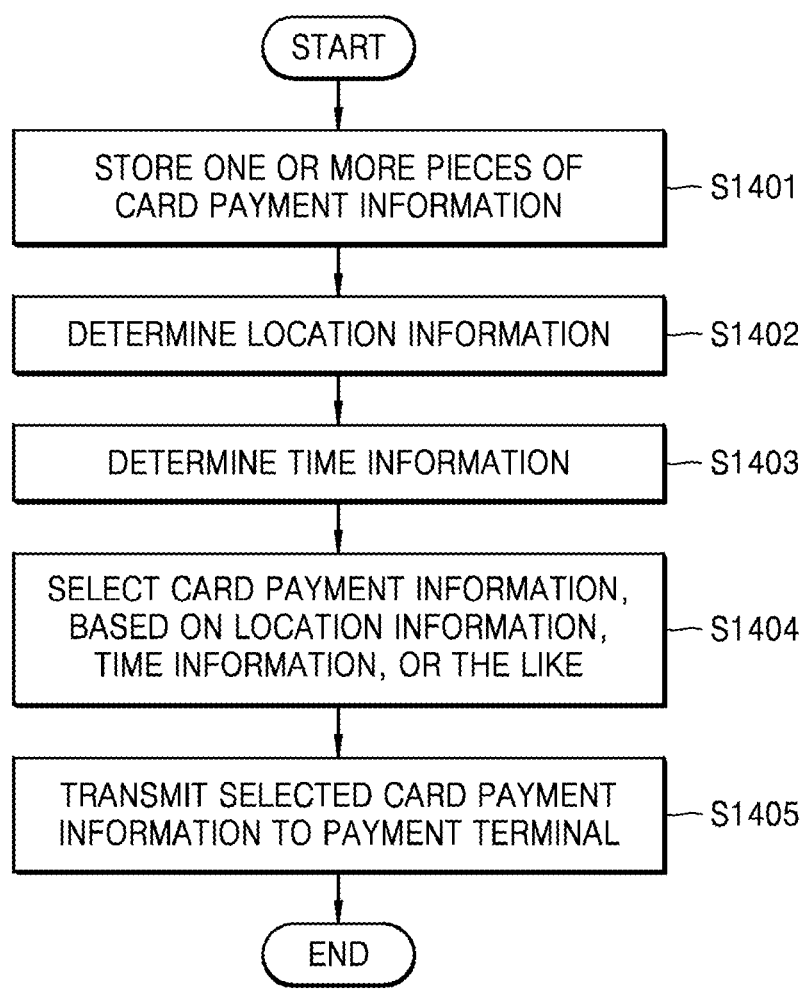
FIG. 14 illustrates a flowchart of an example in which the first mobile device selects card payment information and performs a payment.

FIG. 14 illustrates a flowchart of an example in which the first mobile device 100 selects card payment information and performs a payment.

In operation S1401, the first mobile device 100 may store one or more pieces of card payment information.

According to the present exemplary embodiment, the first mobile device 100 may receive, from a user, an input of card payment information including a card number, card company information, a numeric password, a card validity period, or the like, and may register the card payment information therein.

The first mobile device 100 may receive the one or more pieces of card payment information from the second mobile device 200 and may store the one or more pieces of card payment information.

Figure 27:
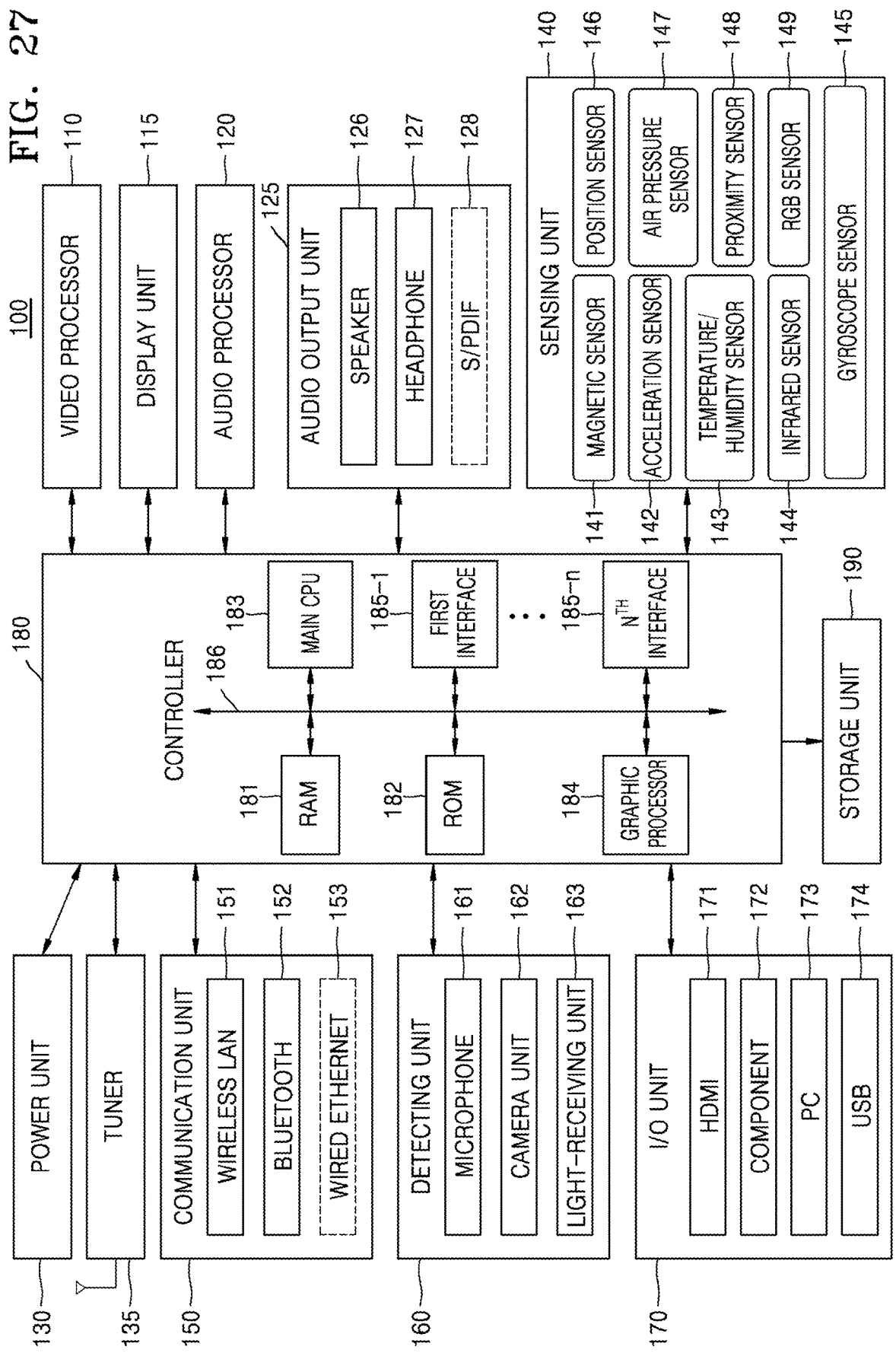

In operation S1402, the first mobile device 100 may determine indoor and outdoor locations of the first mobile device 100 by using a location sensor 146 (refer to FIG. 27). For example, the location sensor 146 may be a GPS but is not limited thereto.

In operation S1403, the first mobile device 100 may determine time information. In the present exemplary embodiment, the first mobile device 100 may determine a time of a card payment.

In operation S1404, the first mobile device 100 may select card payment information, based on information about the locations, the time information, or the like.

For example, the first mobile device 100 may select card payment information corresponding to a card that offers a discount at a current location of the first mobile device 100, i.e., a place (e.g., an S store) where the user is located. The first mobile device 100 may select card payment information corresponding to a card that offers a discount when the user attempts to initiate a card payment during a predetermined time period.

In operation S1405, the first mobile device 100 may transmit the selected card payment information to a payment terminal.

Figure 15:
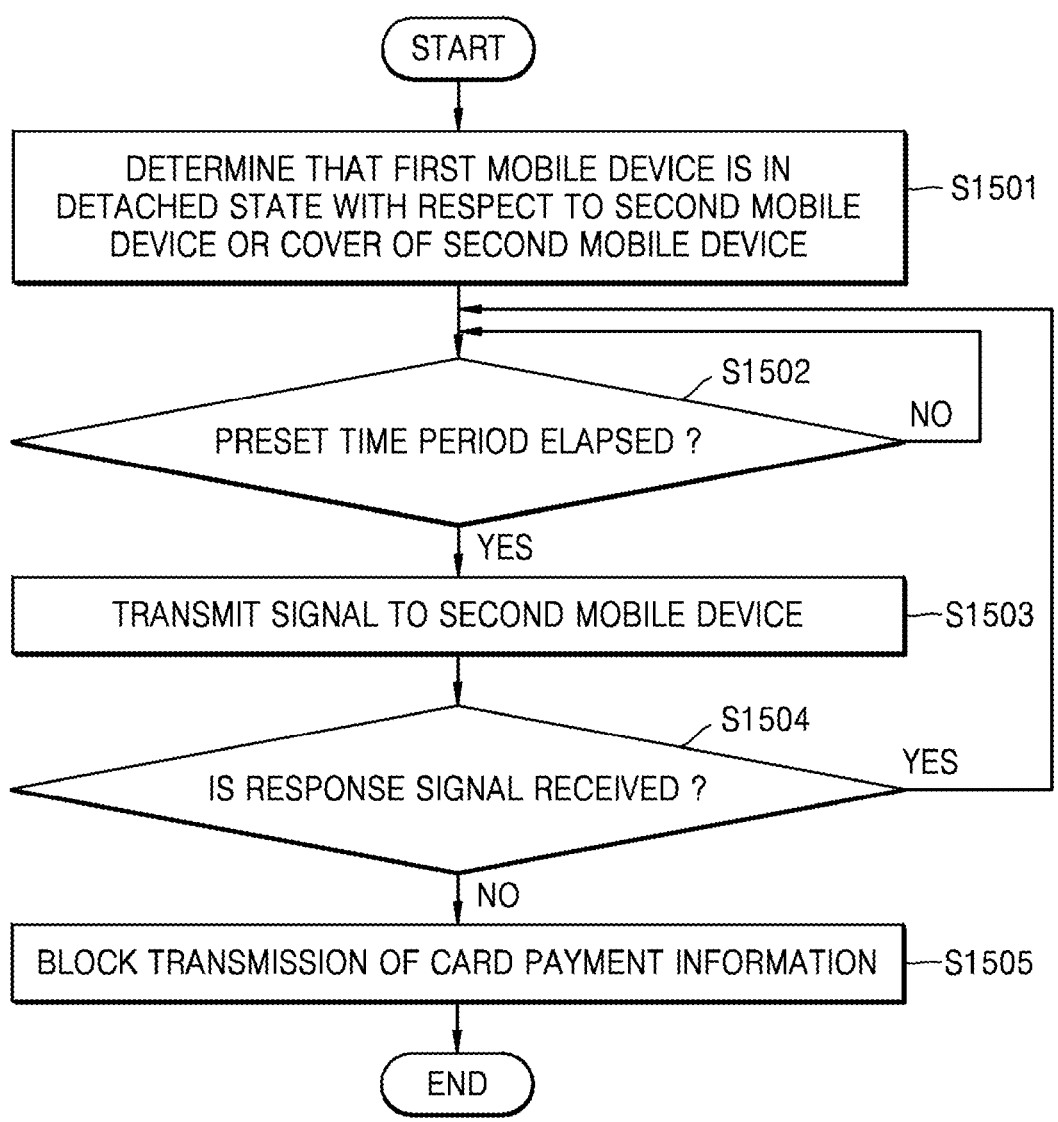
FIG. 15 is a flowchart of an example of blocking transmission of card payment information, according to an exemplary embodiment.

FIG. 15 is a flowchart of an example of blocking transmission of card payment information, according to an exemplary embodiment.

According to the present exemplary embodiment, when a predefined time period elapses after the first mobile device 100 was detached from the second mobile device 200, the first mobile device 100 may check whether it is possible to communicate with the second mobile device 200, and if the communication is not possible, the first mobile device 100 may block a card payment. If the first mobile device 100 has been detached from the second mobile device 200 for a preset time period or longer, there is a chance that the first mobile device 100 has been lost, and thus, the first mobile device 100 may block a card payment.

In operation S1501, the first mobile device 100 may determine that the first mobile device 100 is in a detached state with respect to the second mobile device 200 or the cover 300 of the second mobile device 200. The determination with respect to the detachment is described above, thus, descriptions thereof are omitted here.

In operations S1502 and S1503, when the first mobile device 100 determines that a preset time period has elapsed after the first mobile device 100 was detached from the second mobile device 200 or the cover 300, the first mobile device 100 may transmit a predefined signal to the second mobile device 200 so as to check whether communication with the second mobile device 200 is possible.

In operations S1504 and S1505, when the first mobile device 100 does not receive a response signal responding to the signal transmitted in operation S1503, the first mobile device 100 may block transmission of card payment information.

FIGS. 16 through 19 illustrate examples of determining whether the first mobile device 100 is in a lost state, according to exemplary embodiments.

Figure 16:
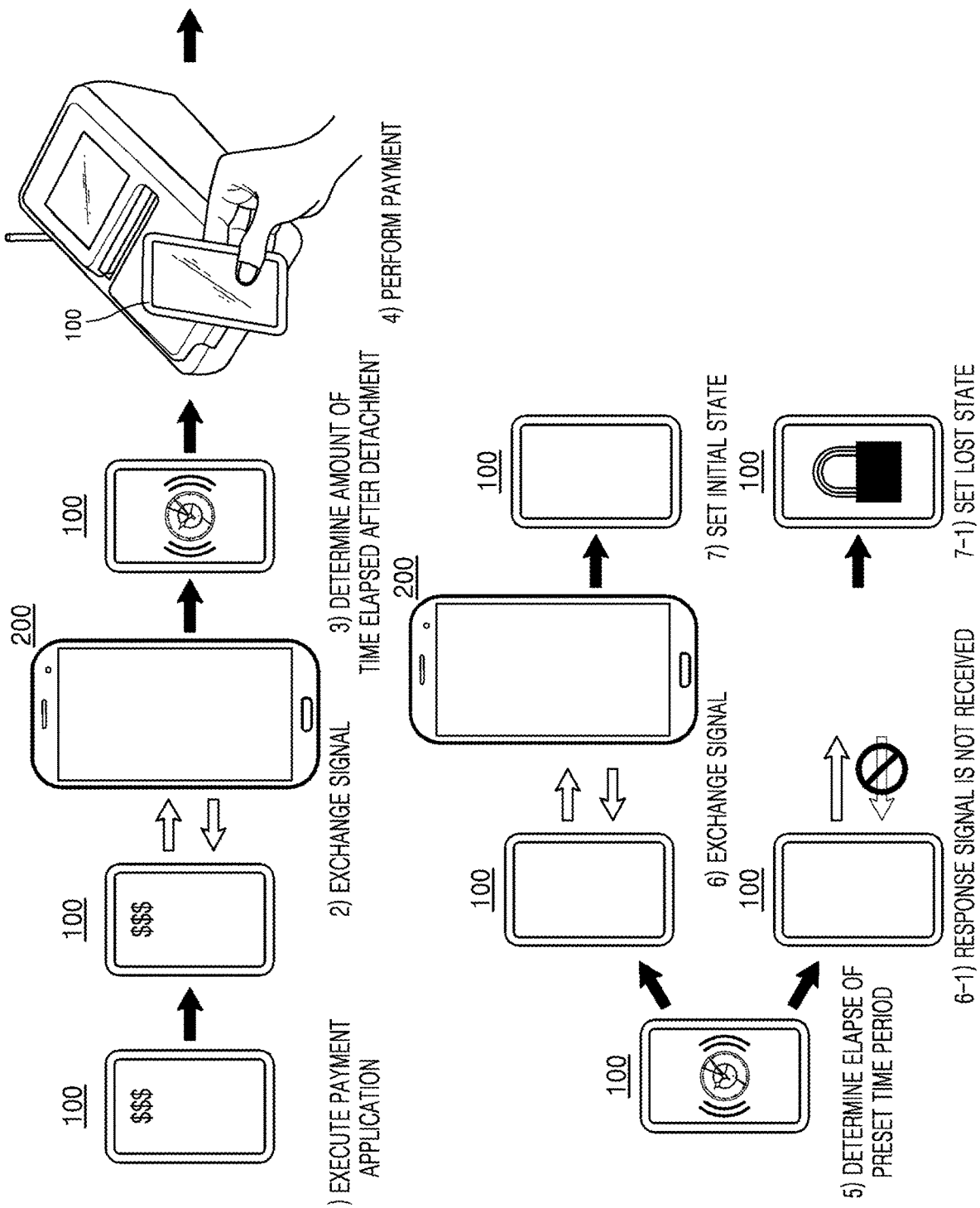
FIGS. 16 through 19 illustrate examples of determining whether the first mobile device is in a lost state, according to exemplary embodiments.

As illustrated in FIG. 16, when a payment application is executed, the first mobile device 100 may transmit a predefined signal to the second mobile device 200, may receive a response signal responding to the transmitted signal, and thus may determine, based on the response signal, that the first mobile device 100 is in the detached state but within a predefined communication range of the second mobile device 200. According to the present exemplary embodiment, the first mobile device 100 may determine that the first mobile device 100 is located within the predefined distance range, based on a strength of the response signal received from the second mobile device 200, a time required for receiving the response signal, etc.

According to the present exemplary embodiment, the first mobile device 100 may determine the amount of time which has elapsed after the first mobile device 100 was detached from the second mobile device 200 or the cover 300.

According to the present exemplary embodiment, while the first mobile device 100 is detached from the second mobile device 200, the first mobile device 100 may perform a payment function by approaching or contacting a payment terminal.

According to the present exemplary embodiment, when a preset time period elapses after the first mobile device 100 was detached from the second mobile device 200, the first mobile device 100 may attempt to communicate with the second mobile device 200, and if the first mobile device 100 does not receive the response signal, the first mobile device 100 may determine that the first mobile device 100 has been lost, thus, the first mobile device 100 may block the payment function.

Figure 17:
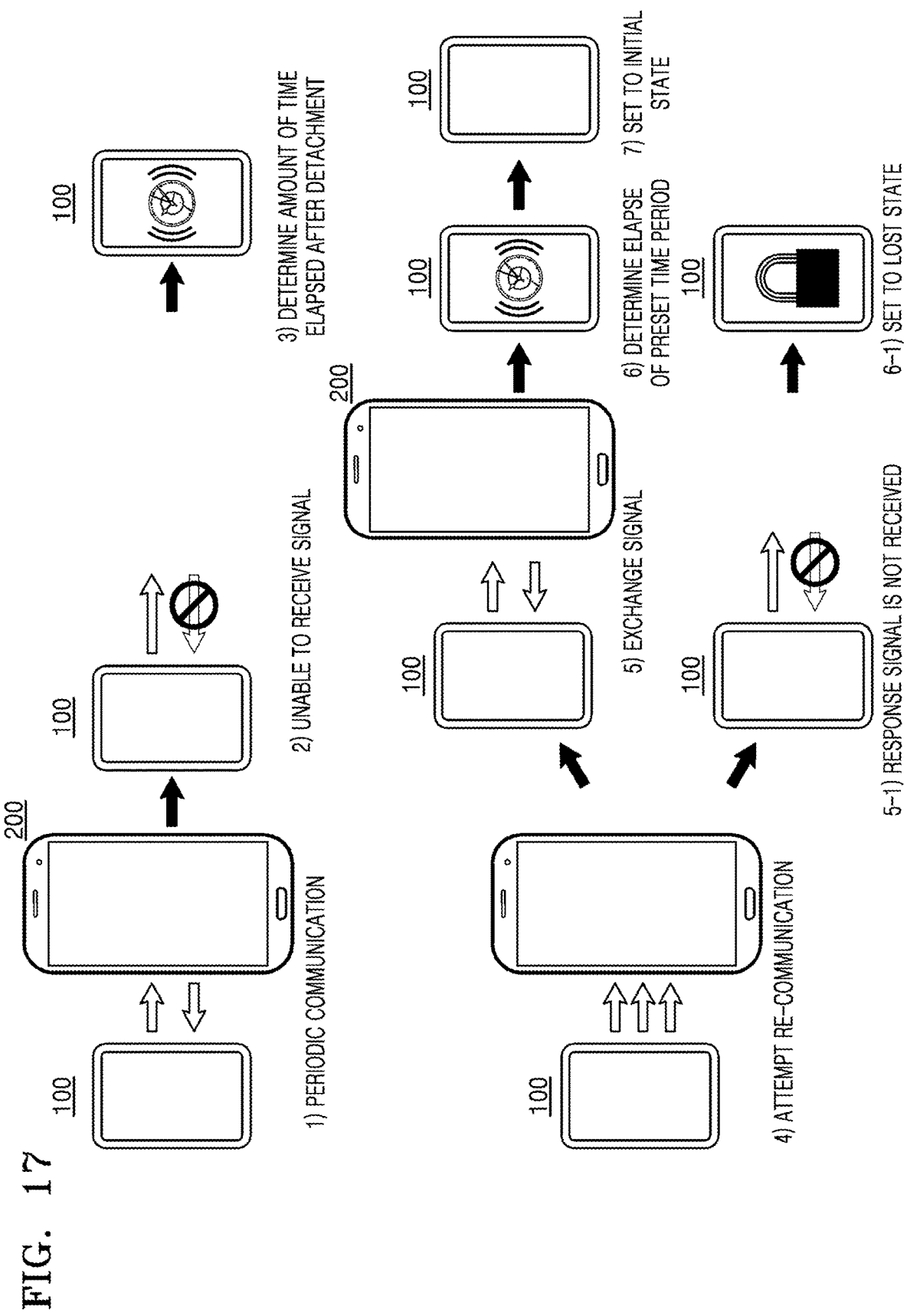

Referring to FIG. 17, while the first mobile device 100 does not perform the payment function, the first mobile device 100 may periodically attempt to communicate with the second mobile device 200 at preset time intervals and may determine occurrence of the lost state.

In the present exemplary embodiment, if the first mobile device 100 transmits a predefined signal to the second mobile device 200 and does not receive a response signal responding to the transmitted signal, after an elapse of a certain time period, the first mobile device 100 may attempt to communicate with the second mobile device 200 by re-transmitting the predefined signal to the second mobile device 200.

When the first mobile device 100 does not receive the response signal from the second mobile device 200, the first mobile device 100 may determine that the first mobile device 100 has been lost, and may block the payment function.

The first mobile device 100 may determine a time period elapsed after the first mobile device 100 was detached from the second mobile device 200 or the cover 300, and when a preset time period has elapsed, the first mobile device 100 may attempt to communicate with the second mobile device 200. In this regard, when the first mobile device 100 receives a response signal from the second mobile device 200, the first mobile device 100 may determine that the first mobile device 100 has been returned to the second mobile device 200.

When the first mobile device 100 determines that the first mobile device 100 is returned to a distance range where the first mobile device 100 is communicationable with the second mobile device 200, the first mobile device 100 may reset to an initial status, e.g., the time elapsed after the first mobile device 100 was detached from the second mobile device 200 may be reset.

Figure 18:
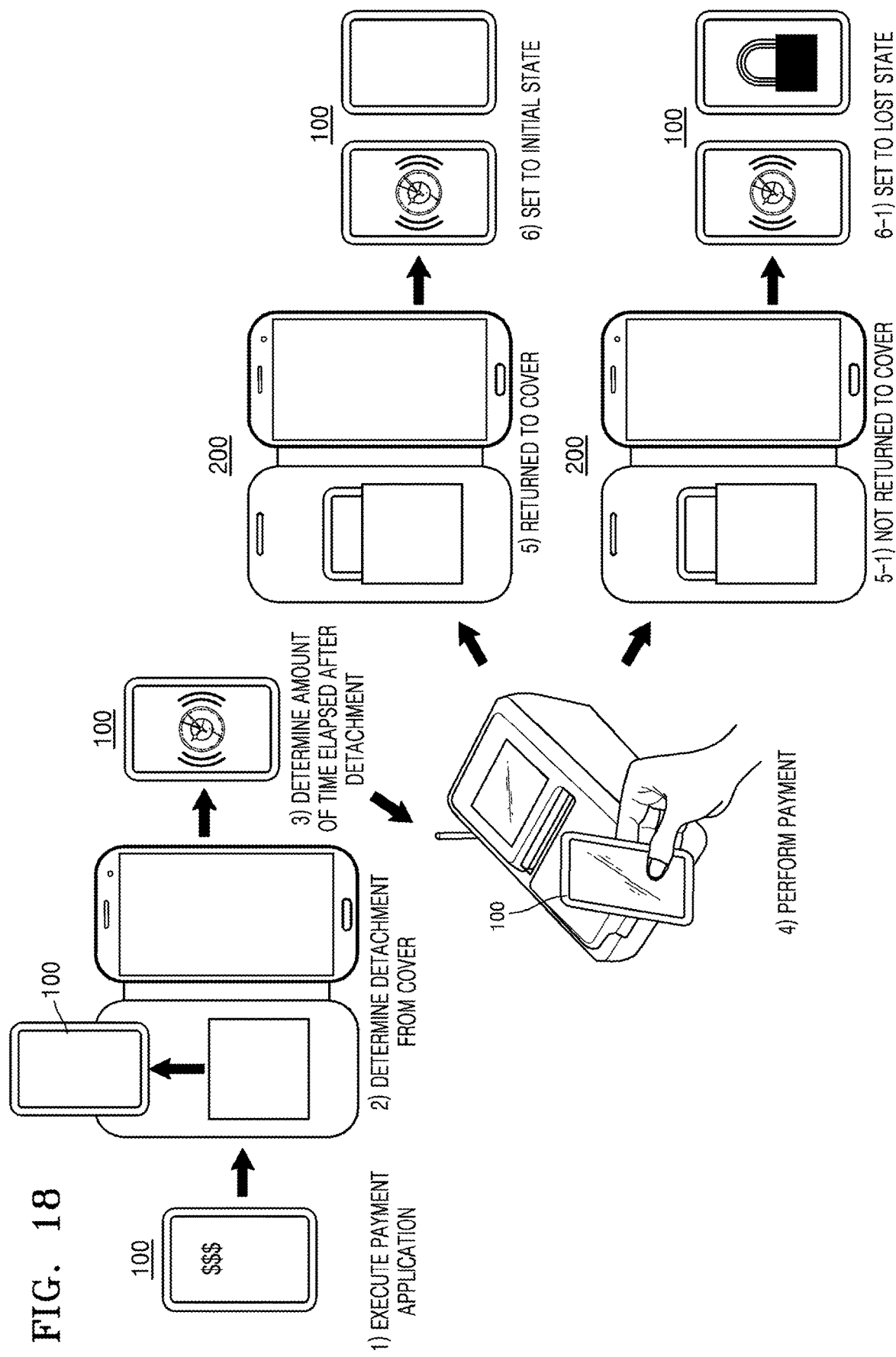

Referring to FIG. 18, the first mobile device 100 may determine whether the first mobile device 100 is returned to the cover 300 within a predefined time period after the first mobile device 100 was detached from the cover 300 of the second mobile device 200.

According to the present exemplary embodiment, if the first mobile device 100 is returned to the cover 300 within the predefined time period after the first mobile device 100 was detached from the cover 300 of the second mobile device 200, the first mobile device 100 may reset the time elapsed after the first mobile device 100 was detached from the second mobile device 200.

According to the present exemplary embodiment, if the first mobile device 100 is not returned to the cover 300 within the predefined time period after the first mobile device 100 was detached from the cover 300 of the second mobile device 200, the first mobile device 100 may determine that the first mobile device 100 has been lost.

Figure 19:
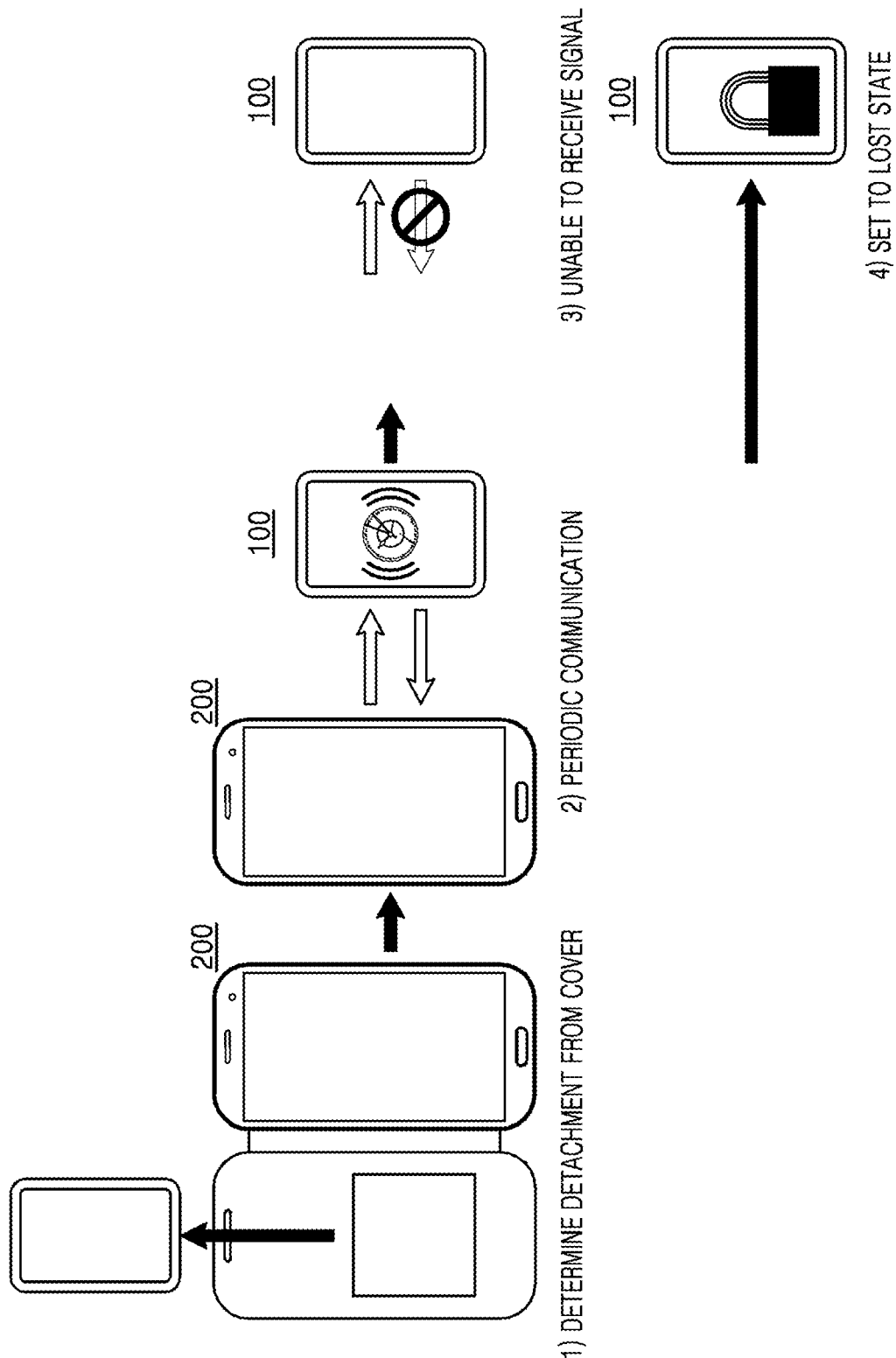

Referring to FIG. 19, after the first mobile device 100 is detached from the cover 300, the first mobile device 100 may periodically exchange a predefined signal with the second mobile device 200 at preset time intervals so as to determine detachment from the second mobile device 200.

According to the present exemplary embodiment, if the first mobile device 100 does not receive a response signal from the second mobile device 200, the first mobile device 100 may determine that the first mobile device 100 is in a lost state.

Figure 20:
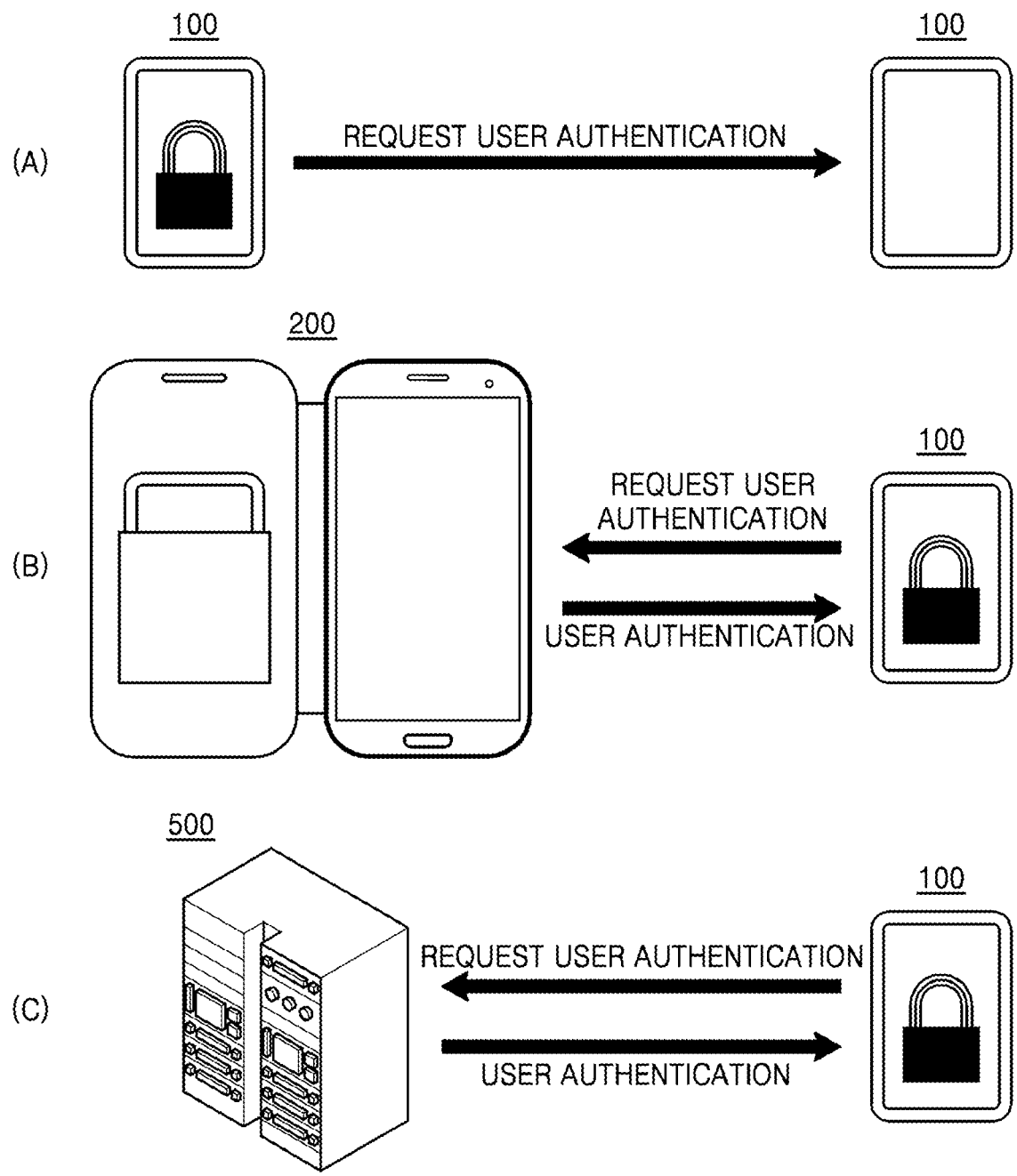
FIGS. 20 and 21 illustrate process examples according to a lost state of the first mobile device.
Figure 21:
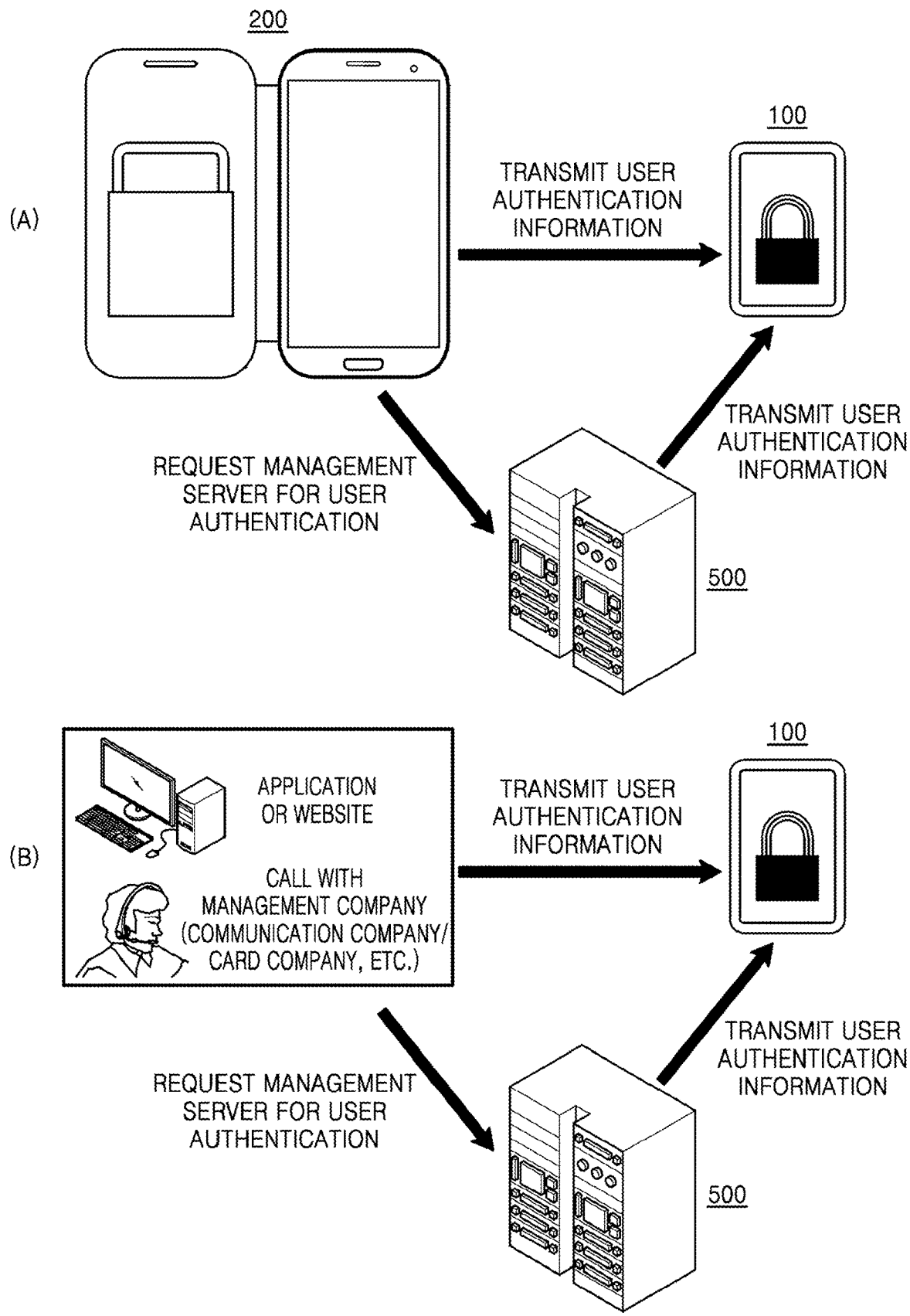

FIGS. 20 and 21 illustrate process examples according to a lost state of the first mobile device 100.

As illustrated in (a) of FIG. 20, when the first mobile device 100 is determined as the lost state, the first mobile device 100 may return to its initial status by performing user authentication. When the first mobile device 100 returns to its initial status, the first mobile device 100 may reset the time elapsed after the first mobile device 100 was detached from the second mobile device 200.

Referring to (b) of FIG. 20, the first mobile device 100 may transmit, to the second mobile device 200, a signal that requests for user authentication for the first mobile device 100 to exit the lost state, so that the mobile device 100 may exit the lost state due to the second mobile device 200. For example, the first mobile device 100 may receive, from the second mobile device 200, information about the user authentication performed by the second mobile device 200 and thus may exit the lost state.

Referring to (c) of FIG. 20, the first mobile device 100 may transmit, to an external server (e.g., a server of a mobile communication company), a signal that requests for user authentication for the first mobile device 100 to exit the lost state, and by receiving predefined user authentication information, the first mobile device 100 may return to its initial state.

For example, the user authentication may include, but is not limited to, an input of a preset numeric password, an input of a pattern, fingerprint recognition, iris recognition, voice recognition, etc.

FIG. 21 illustrates an example in which the first mobile device 100 exits a lost state of the first mobile device 100 due to the second mobile device 200 that interoperates with the first mobile device 100.

According to the present exemplary embodiment, the second mobile device 200 may transmit user authentication information so as to allow the first mobile device 100 to exit the lost state.

Alternatively, the second mobile device 200 may request an external server 500 to allow the first mobile device 100 to exit the lost state, and then the external server 500 may transmit the user authentication information so as to allow the first mobile device 100 to exit the lost state.

Referring to (b) of FIG. 21, a user may perform authentication information by accessing a website of a mobile communication company or the like, or via a phone call, and may request for exiting the lost state.

The user authentication information may include, but is not limited to, a preset numeric password, a pattern, fingerprint information, iris information, voice information, etc.

FIGS. 22 through 25 illustrate examples of performing a card payment by using a plurality of devices.

A payment amount may be split among a number of devices for a single payment event, and each of the devices may perform a card payment for a portion of the amount.

Figure 22:
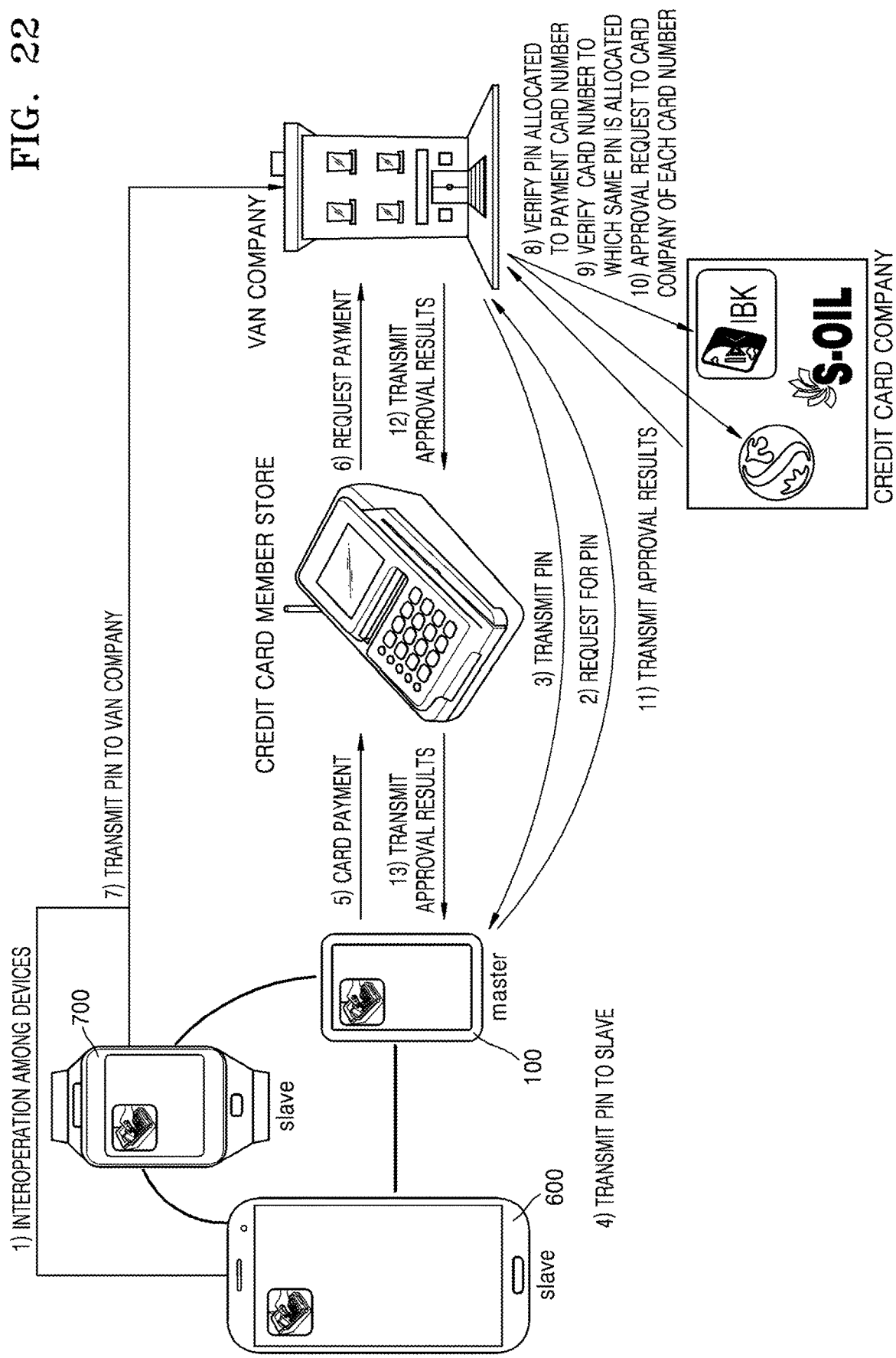
FIGS. 22 through 25 illustrate examples of performing a card payment by using a plurality of devices.

Referring to FIG. 22, a plurality of devices may split a payment amount for a single payment event and may each perform a card payment for a portion of the amount. Hereinafter, it is assumed that one of the plurality of devices is a master device 100, and the rest of the plurality of devices are first and second slave devices 600 and 700 to perform the card payment along with the master device 100.

In the present exemplary embodiment, the master device 100 may interoperate with the first and second slave devices 600 and 700 for data exchange.

The master device 100 and the first and second slave devices 600 and 700 may be, but are not limited to, ultra slim card-type devices, smartphones, wearable devices, tablet PCs, or the like.

Figure 23:
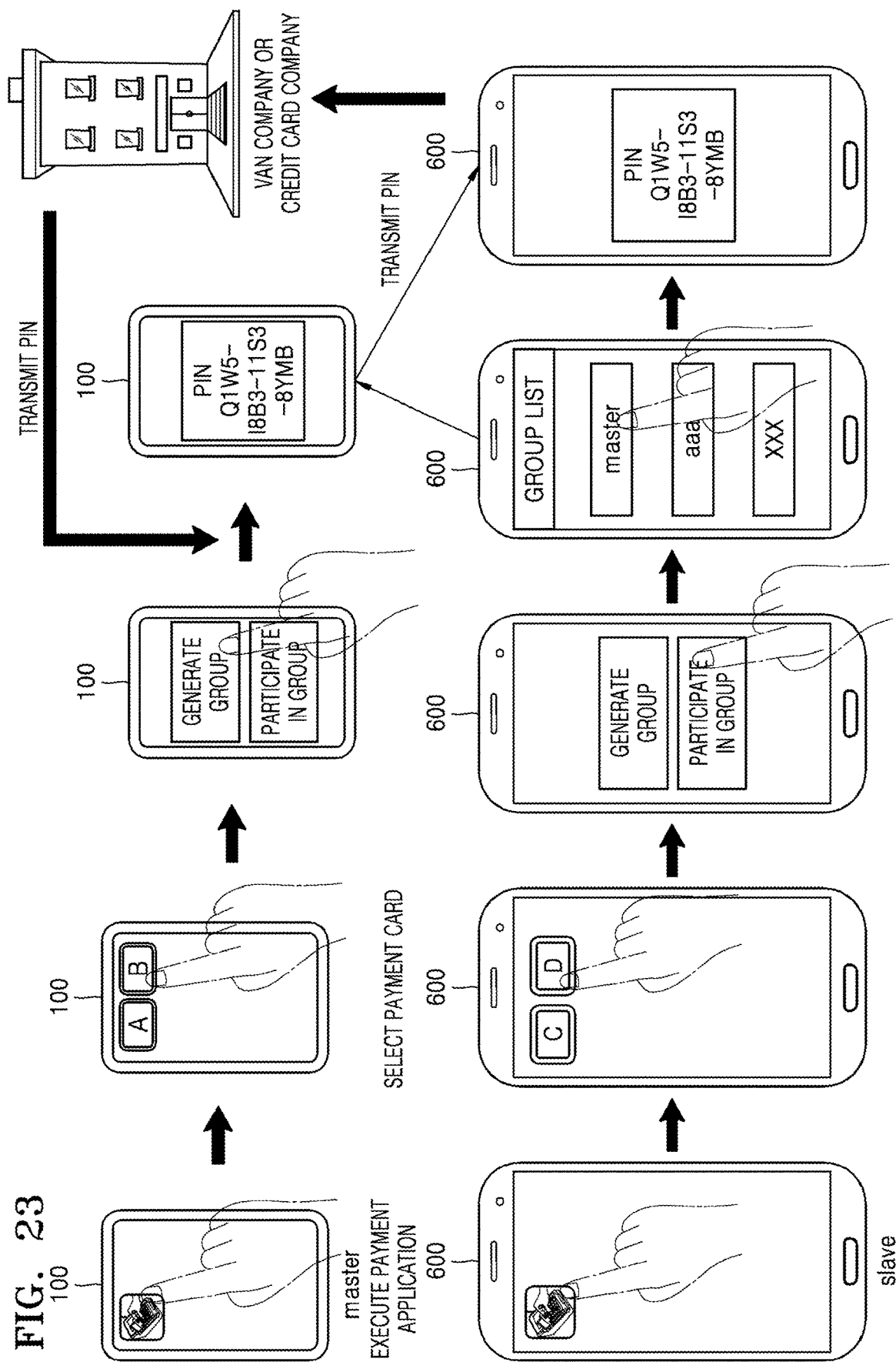

Referring to FIG. 23, the master device 100 may execute a payment application, and may receive a user input of selecting card payment information to be used in a payment.

According to the present exemplary embodiment, the master device 100 may request a VAN company for a personal identification number (PIN), and the VAN company may allocate and transmit a predefined PIN to the master device 100. The PIN may indicate a user identification number that the VAN company provides with respect to one payment event.

The master device 100 may share the PIN received from the VAN company with at least another device to split a payment amount between the master device 100 and the at least one other device, and each of the devices may perform a card payment for a portion of the payment amount.

As illustrated in FIG. 23, the master device 100 may share the PIN with the first slave device 600 by using wireless communication including Bluetooth, Wi-Fi Direct, etc.

For example, the first slave device 600 may scan Bluetooth devices located in a near distance range, and may select and register a list of the master devices 100 to be connected. The first slave device 600 may transmit a signal for requesting a share of PIN to the master device 100, and the master device 100 may transmit the PIN to the first slave device 600.

Figure 24:
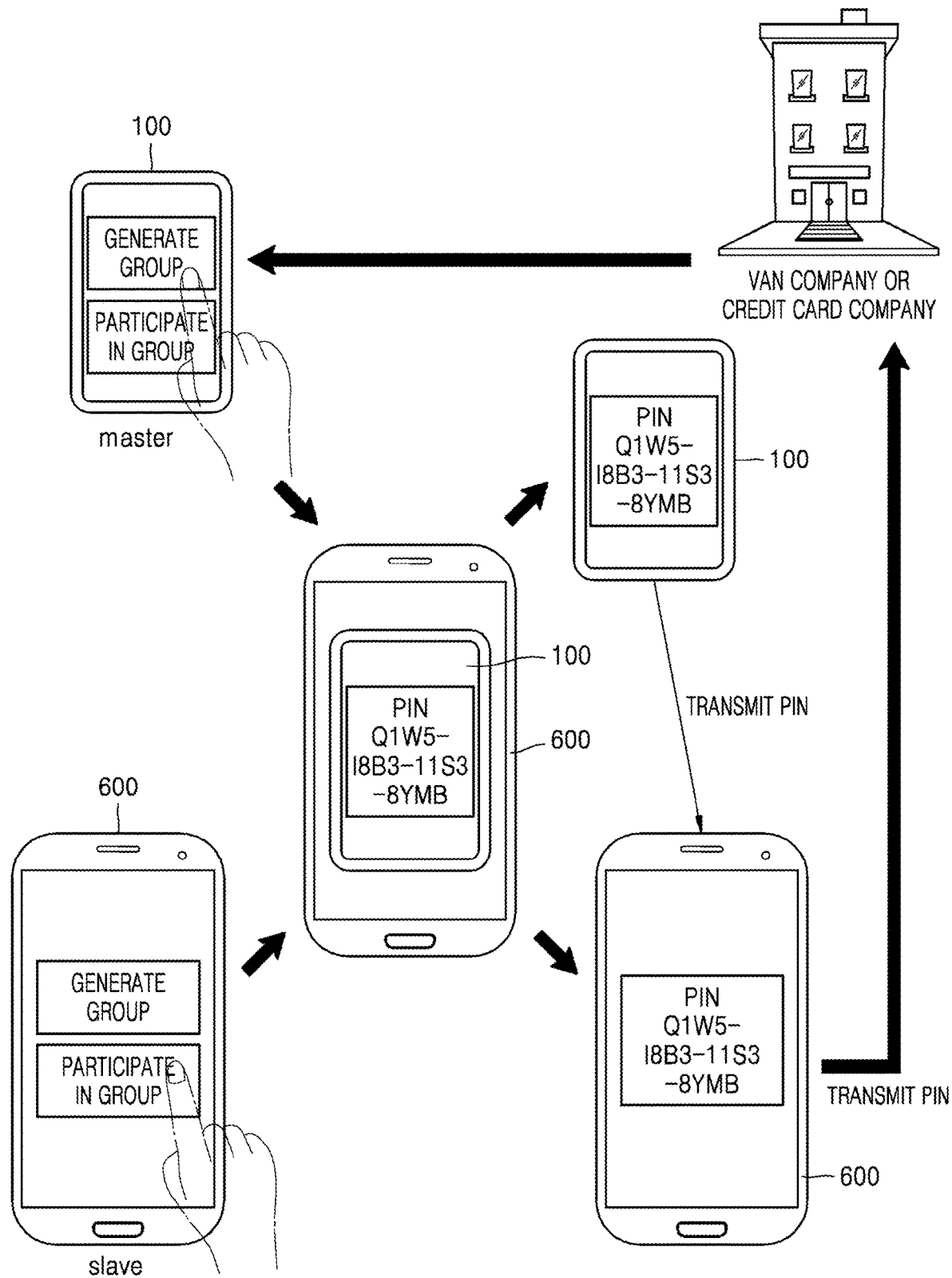

As illustrated in FIG. 24, the PIN may be shared between the master device 100 and the first slave device 600 by a contact between the master device 100 and the first slave device 600 via radio frequency identification (RFID).

Figure 25:
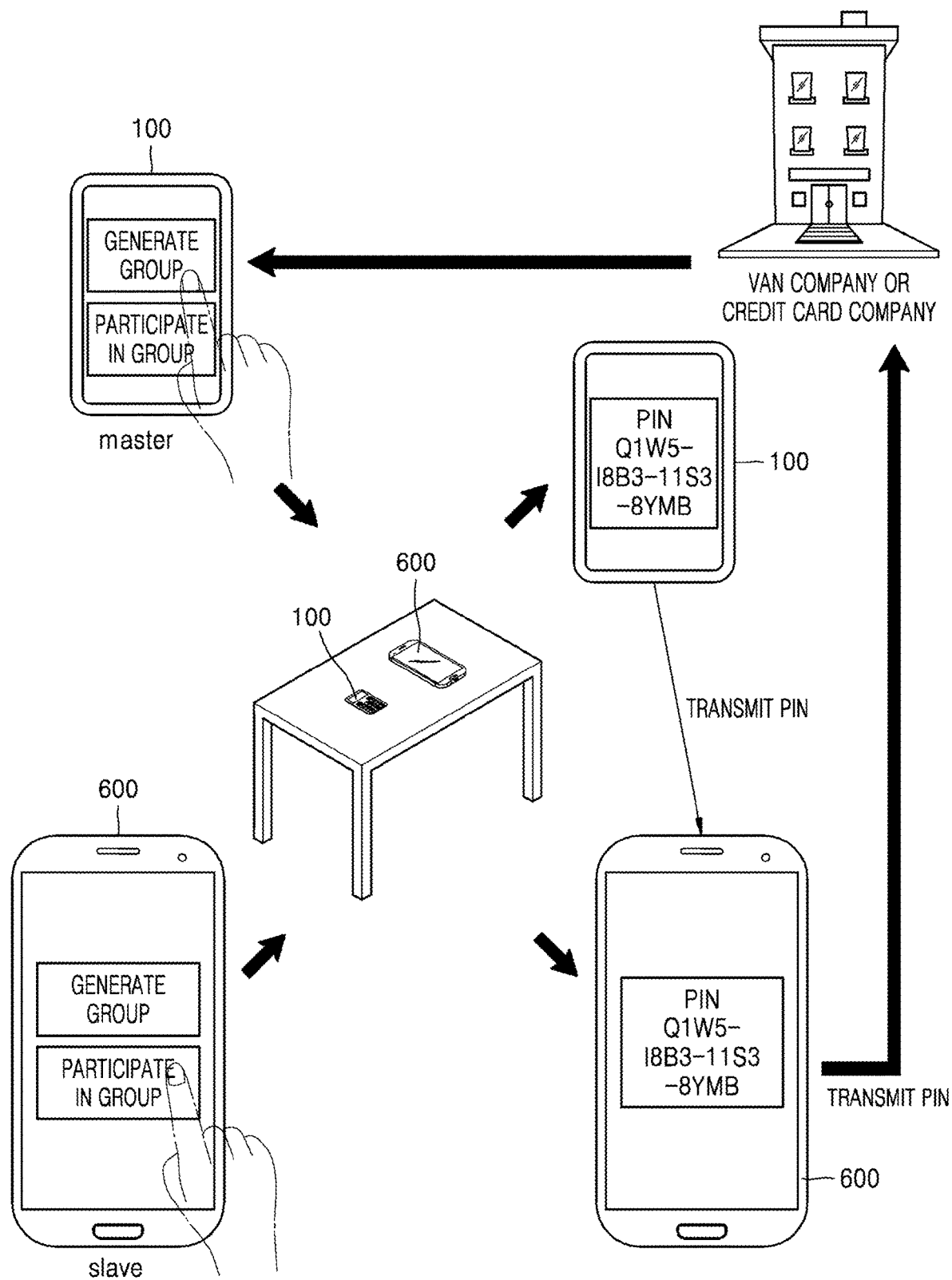

As illustrated in FIG. 25, the PIN may be shared among devices on a same table by establishing a network via NFC.

Referring to FIG. 22, when the master device 100 transmits card payment information to a card payment terminal of a credit card member store, the card payment terminal may transmit a payment request to a VAN company. The first and second slave devices 600 and 700 that interoperate with the master device 100 may transmit, to the VAN company, a PIN received from the master device 100.

The VAN company may receive the card payment information and the payment request from the master device 100. The VAN company may receive, from the first slave device 600, the PIN that is equal to the PIN that was allocated to the master device 100 by the VAN company.

The VAN company may request an approval request from a credit card company, based on the card payment information received from the master device 100. According to another exemplary embodiment, the VAN company may check payment information of each of slave devices that transmitted the same PIN as the PIN that was allocated to the master device 100, and may request an approval request from a credit card company, based on the checked payment information.

When the VAN company receives approval results from the credit card companies, the VAN company may transmit, to the card payment terminal of the credit card member store, the approval results received from the credit card companies. The card payment terminal of the credit card member store may transmit the approval results to the master device 100 and the slave devices, respectively.

Figure 26:
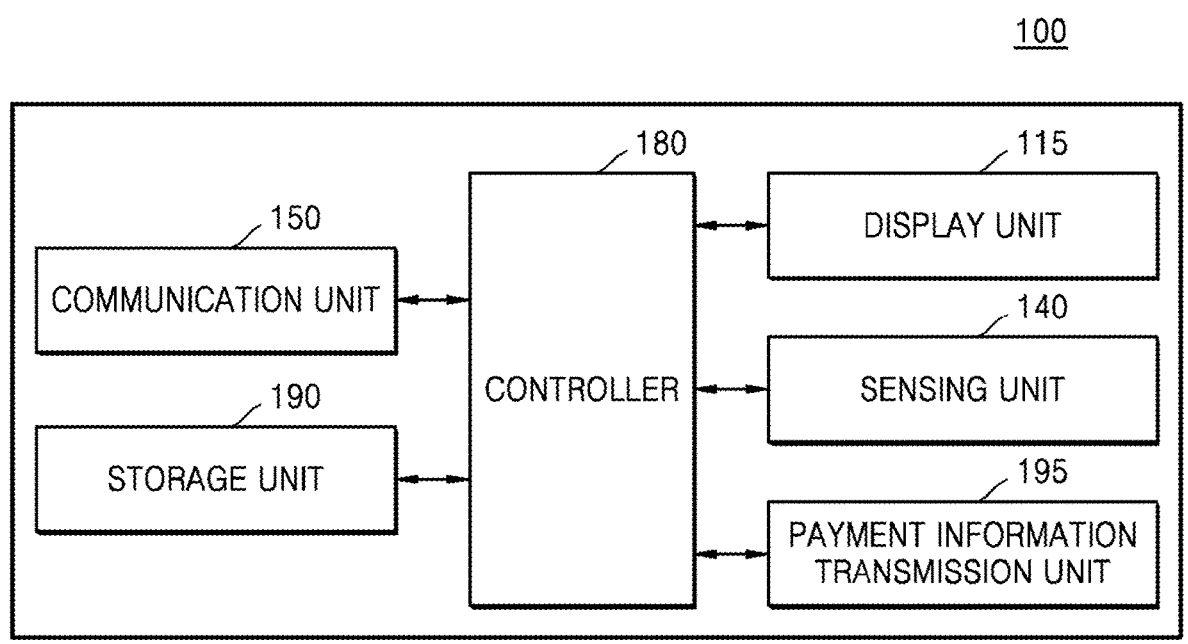
FIGS. 26 and 27 are block diagrams of the device, according to exemplary embodiments.

FIGS. 26 and 27 are block diagrams of the device 100, according to exemplary embodiments.

Referring to FIG. 26, the device 100 may include the display unit 115, the sensing unit 140, a communication unit 150, the storage unit 190, a payment information transmission unit 195, and the controller 180. However, not all elements shown in FIG. 26 are necessary elements of the device 100. That is, the device 100 may be embodied with more or less elements than the elements shown in FIG. 26.

For example, as illustrated in FIG. 27, the device 100 may further include a video processor 110, an audio processor 120, an audio output unit 125, a power unit 130, a tuner 135, a detecting unit 160, and an input/output (I/O) unit 170.

Hereinafter, the elements are described below.

The video processor 110 may process video data received by the device 100. The video processor 110 may perform various image processing such as decoding, scaling, noise filtering, frame rate conversion, resolution conversion, or the like on the video data.

By control of the controller 180, the display unit 115 displays, on a screen, a video included in a broadcasting signal that is received by the tuner 135. The display unit 115 may display content (e.g., a video, etc.) that is received via the communication unit 150 or the I/O unit 170. The display unit 115 may output, by control of the controller 180, a video stored in the storage unit 190. Also, the display unit 115 may display a voice user interface (UI) (e.g., a voice UI including a voice command guide) for performing a voice recognition task corresponding to voice recognition or a motion UI (e.g., a motion UI including a user motion guide for motion recognition) for performing a motion recognition task corresponding to motion recognition.

The audio processor 120 may process audio data. The audio processor 120 may perform various processing such as decoding, amplification, noise filtering, or the like on the audio data. The audio processor 120 may include a plurality of audio processing modules so as to process a plurality of pieces of audio data corresponding to a plurality of pieces of content.

The audio output unit 125 outputs, by control of the controller 180, audio included in a broadcasting signal that is received by the tuner 135. The audio output unit 125 may output audio (e.g., music or a sound) that is input via the communication unit 150 or the I/O unit 170. Also, the audio output unit 125 may output, by control of the controller 180, audio stored in the storage unit 190. The audio output unit 125 may include at least one of a speaker 126, a headphone output terminal 127, and a Sony/Philips Digital Interface Format (S/PDIF) output terminal 128. The audio output unit 125 may include a combination of the speaker 126, the headphone output terminal 127, and the S/PDIF output terminal 128.

The power unit 130 supplies, by control of the controller 180, power, which is input from an external power source, to the internal elements 110 through 190. Also, the power unit 130 may supply, by control of the controller 180, power to the internal elements 110 through 190, wherein the power is output from one or more batteries (not shown) arranged in the device 100.

The tuner 135 may tune and select a frequency of a channel that a user wants to receive via the device 100, wherein the frequency is obtained by tuning, via amplification, mixing, and resonance, frequency components of a broadcasting signal that is received in a wired or wireless manner. The broadcasting signal includes an audio signal, a video signal, and additional information (e.g., an electronic program guide (EPG)).

The tuner 135 may receive a broadcasting signal in a frequency band corresponding to a channel number (e.g., a cable broadcasting channel no. 506), according to a user input. The broadcasting signal may be, for example, a control signal broadcast from a control apparatus, e.g., input of a channel number, a channel up or down input, or a channel selection via an EPG screen.

The tuner 135 may receive a broadcasting signal from various sources including ground wave broadcasting, cable broadcasting, satellite broadcasting, internet broadcasting, or the like. The tuner 135 may also receive a broadcasting signal from a source such as analog broadcasting or digital broadcasting. The broadcasting signal received by the tuner 135 is decoded (e.g., audio decoding, video decoding, or additional information decoding) and is split into audio, video, and/or additional information. The split audio, video, and/or additional information may be stored in the storage unit 190 by control of the controller 180.

The device 100 may include one or more tuners 135. The tuner 135 may be embodied as one body (i.e., all-in-one) with the device 100, may be embodied as a separate electronic apparatus (e.g., a set-top box (not shown) that is electrically connected with the device 100 and has a tuner part, or may be embodied as a tuner (not shown) that is connected to the I/O unit 170.

The sensing unit 140 may sense a state of the device 100 or a state around the device 100, and may transfer sensed information to the controller 180. The sensing unit 140 may include, but is not limited to, at least one of a magnetic sensor 141, an acceleration sensor 142, a temperature/humidity sensor 143, an infrared sensor 144, a gyroscope sensor 145, a position sensor (e.g., a GPS) 146, an air pressure sensor 147, a proximity sensor 148, and an RGB sensor 149. Functions of the sensors may be intuitionally deduced by one of ordinary skill in the art by based on the names of the sensors, and thus, descriptions thereof are omitted here.

The sensing unit 140 may include a sensor for sensing a touch input via an input tool and a sensor for sensing a touch input via a user. For example, the sensor for sensing a touch input via a user may be included in a touchscreen or a touch pad, and the sensor for sensing a touch input via an input tool may be located below the touchscreen or the touch pad or may be included in the touchscreen or the touch pad.

According to the present exemplary embodiment, the sensing unit 140 may sense whether the first mobile device 100 contacts the cover 300 of the second mobile device 200.

The communication unit 150, by control of the controller 180, may connect the device 100 with an external device (e.g., an audio device). The controller 180 may exchange content with the connected external device, may download an application from the external device, or may perform web browsing by using the communication unit 150.

The communication unit 150 may include at least one of a wireless LAN 151, Bluetooth 152, and a wired Ethernet 153 so as to correspond to performance and a structure of the device 100. Also, the communication unit 150 may include a combination of the wireless LAN 151, the Bluetooth 152, and the wired Ethernet 153.

The communication unit 150 may include, but is not limited to, a Bluetooth communication unit, a Bluetooth low energy (BLE) communication unit, an NFC unit, a WLAN (Wi-Fi) communication unit, a ZigBee communication unit, an infrared Data Association (IrDA) communication unit, a Wi-Fi Direct (WFD) communication unit, a ultra wideband (UWB) communication unit, or an Ant+ communication unit.

The communication unit 150 exchanges a wireless signal with at least one of a base station, an external terminal, and a server on a mobile communication network. The wireless signal may include various types of data according to communication of a sound call signal, a video call signal, or a text/multimedia message.

The communication unit 150 may include a broadcast receiving unit (not shown) that receives a broadcast signal and/or information related to a broadcast from the outside through a broadcast channel. The broadcast channel may include a satellite channel and a ground wave channel.

The communication unit 150 may receive, by control of the controller 180, a control signal of an external control device. The control signal may be implemented as a Bluetooth-type control signal, a RF-type control signal, or a Wi-Fi type control signal.

The communication unit 150 may exchange, by control of the controller 180, data with the second mobile device 200.

According to the present exemplary embodiment, when a preset time period elapses after the first mobile device 100 was detached from the second mobile device 200, the communication unit 150, by control of the controller 180, may transmit a predefined signal to the second mobile device 200, and may receive a response signal responding to the transmitted signal.

According to the present exemplary embodiment, the communication unit 150, by control of the controller 180, may transmit a predefined signal to the second mobile device 200 at preset time intervals after the first mobile device 100 was detached from the second mobile device 200, and may receive a response signal responding to the transmitted signal.

The communication unit 150, by control of the controller 180, may receive authentication information to be used in user authentication from the second mobile device 200.

The detecting unit 160 detects a user's voice, a user's image, or interaction of the user.

A microphone 161 receives an uttered voice of the user. The microphone 161 may convert the received voice into an electrical signal and may output the electrical signal to the controller 180. The voice of the user may include a voice command or voice response that corresponds to a menu or a function of the device 100. The microphone 161 may recognize the voice of the user while within a predetermined distance from a location of the user, for example, within 4 meters from the user. The predetermined distance may be changed in correspondence with a level of a user's voice and a peripheral environment (e.g., speaker volume, ambient noise, etc.).

The microphone 161 may be integrally formed with the device 100 or may be separately formed from the device 100. The separately-formed microphone 161 may be electrically connected to the device 100 via the communication unit 150 or the I/O unit 170.

It will be obvious to one of ordinary skill in the art that the microphone 161 may not be used according to performance and a structure of the device 100.

A camera unit 162 may be configured of a lens (not shown) and an image sensor (not shown). The camera unit 162 may support an optical zoom or a digital zoom by using a plurality of lenses and image processing. A recognizable range of the camera unit 162 may be variously set according to camera angle and peripheral environment conditions. In a case where the camera unit 162 includes a plurality of cameras, the camera unit 162 may receive a three-dimensional (3D) still image or a 3D motion by using the plurality of cameras.

The camera unit 162 may be integrally formed with the device 100 or may be separately formed from the device 100. A separate apparatus (not shown) including the separately-formed camera unit 162 may be electrically connected to the device 100 via the communication unit 150 or the I/O unit 170.

It will be obvious to one of ordinary skill in the art that the camera unit 162 may not be used according to performance and a structure of the device 100.

A light-receiving unit 163 receives an optical signal (including a control signal) from an external controller (not shown) via a light-receiving window of a bezel (not shown) of the display unit 115. The light-receiving unit 163 may receive an optical signal corresponding to a user input (e.g., a touch, a press, a touch gesture, a voice, or a motion) from the external controller. The control signal may be extracted from the optical signal by control of the controller 180.

The I/O unit 170 receives, by control of the controller 180, video (e.g., a moving picture, etc.), audio (e.g., a voice, music, etc.), and additional information (e.g., an EPG, etc.) from an external source of the device 100. The I/O unit 170 may include one of a high-definition multimedia interface (HDMI) port 171, a component jack 172, a PC port 173, and a universal serial bus (USB) port 174. The I/O unit 170 may include a combination of the HDMI port 171, the component jack 172, the PC port 173, and the USB port 174.

It will be obvious to one of ordinary skill in the art that a configuration and operations of the I/O unit 170 may vary in one or more exemplary embodiments.

The controller 180 controls all operations of the device 100 and a flow of signals between internal elements 110 through 190 of the device 100, and performs a data processing function. If a condition that is input or is set by a user and is stored is satisfied, the controller 180 may execute an operating system (OS) and various applications stored in the storage unit 190.

The controller 180 may include a random-access memory (RAM) 181 used to store a signal or data received from an external source of the device 100 or used as a storage domain for various tasks that are performed in the device 100, a read-only memory (ROM) 182 that stores a control program for controlling the device 100, and a processor 183 (also referred to as the main central processing unit (main CPU) 183).

The processor 183 may include a graphic processing unit (GPU) (not shown) for processing graphics that correspond to a video. The processor 183 may be embodied as a System on Chip (SoC) including a core (not shown) and the GPU. The processor 183 may include a single core, a dual-core, a triple-core, a quad-core, or a multi-core.

The processor 183 may include a plurality of processors. For example, the processor 183 may be embodied as a main processor (not shown) and a sub-processor (not shown) that operates during a sleep mode.

A graphic processor 184 generates a screen including various objects such as an icon, an image, a text, or the like, by using a calculation unit (not shown) and a rendering unit (not shown). The calculation unit calculates coordinate values of the objects that are to be displayed according to a layout of a screen by using a user interaction detected by the detecting unit 160, and calculates attribute values of shapes, sizes, or colors of the objects. Then, the rendering unit may generate screens with various layouts including the objects based on the attribute values calculated by the calculation unit. The screen generated by the rendering unit may be displayed in regions of the display unit 115.

First through nth interfaces 185-1 through 185-*n* are connected to the aforementioned elements. One of the first through nth interfaces 185-1 through 185-*n* may function as a network interface that is connected to an external device via a network.

The RAM 181, the ROM 182, the processor 183, the graphic processor 184, and the first through nth interfaces 185-1 through 185-*n* may be connected to each other via an internal bus 186.

In one or more exemplary embodiments, the term "controller" may include the processor 183, the ROM 182, and the RAM 181.

The controller 180 of the first mobile device 100 may determine that the first mobile device 100 is in a detached state with respect to the second mobile device 200 or the cover 300 of the second mobile device 200, and may determine transmission of the card payment information, according to the detached state.

The controller 180 may transmit, according to an execution request of a payment application, a signal to the second mobile device 200 by using the communication unit 150, and if a response signal corresponding to the transmitted signal is received, the controller 180 may determine that the first mobile device 100 is in the detached state within a predefined distance range from the second mobile device 200.

When the controller 180 senses, by using the sensing unit 140, that the first mobile device 100 does not contact the cover 300 of the second mobile device 200, the controller 180 may determine the detached state.

The controller 180 may determine the detached state, and according to an elapsed time period after the detachment, the controller 180 may determine whether to perform user authentication for transmission of the card payment information.

When a preset time period elapses after the detachment, the controller 180 may perform the user authentication for transmission of the card payment information.

The controller 180 may receive authentication information for the user authentication from the second mobile device 200 by using the communication unit 150.

The controller 180 may determine the detached state, and according to an elapsed time period after the detached state, the controller 180 may determine whether to block transmission of the card payment information.

When a preset time period elapses after the detached state, the controller 180 may transmit a signal to the second mobile device 200 by using the communication unit 150, and if a response signal corresponding to the transmitted signal is not received, the controller 180 may block the transmission of the card payment information.

The controller 180 may transmit a signal to the second mobile device 200 by using the communication unit 150 at regular intervals after the detached state, and if a response signal corresponding to the transmitted signal is not received, the controller 180 may block the transmission of the card payment information.

The controller 180 may receive the one or more pieces of card payment information from the second mobile device 200 by using the communication unit 150.

The controller 180 may select card payment information from among the one or more pieces of card payment information, which corresponds to a payment situation, and may transmit the selected card payment information.

It will be obvious to one of ordinary skill in the art that a configuration and operations of the controller 180 may vary in one or more exemplary embodiments.

The storage unit 190 may store, by control of the controller 180, various data, programs, or applications for driving and controlling the device 100. The storage unit 190 may store signals or a plurality of pieces of data that are input/output so as to correspond to operations of the video processor 110, the display unit 115, the audio processor 120, the audio output unit 125, the power unit 130, the tuner 135, the communication unit 150, the detecting unit 160, and the I/O unit 170. The storage unit 190 may store a control program for a control operation by the device 100 or the controller 180, an application that is originally provided by a manufacturer or is downloaded from an external source, a GUI related to the application, an object (e.g., an image text, an icon, a button, etc.) for providing the GUI, user information, documents, databases, or related data.

In the present exemplary embodiment, the term "storage unit" includes the storage unit 190, the ROM 182 and the RAM 181 of the controller 180, or a memory card (e.g., a micro secure digital (SD) card (not shown) or a USB memory (not shown)) mounted to the device 100. Also, the storage unit 190 may include a non-volatile memory, a volatile memory, a hard disk drive (HDD), or a solid-state drive (SSD).

Although not illustrated, the storage unit 190 may include a broadcasting receiving module, a channel control module, a volume control module, a communication control module, a voice recognition module, a motion recognition module, a light-receiving module, a display control module, an audio control module, an external input control module, a power control module, a voice database, or a motion database. The aforementioned modules and databases (not shown) of the storage unit 190 may be implemented as a plurality of pieces of software for performing a broadcasting reception control function, a channel control function, a volume control function, a communication control function, a voice recognition function, a motion recognition function, a light-receiving control function, a display control function, an audio control function, an external input control function, a power control function, or a power control function of the other external apparatus so as to control power of the other external apparatus that is connected in a wireless manner (e.g., Bluetooth). The controller 180 may perform the aforementioned functions by using the plurality of pieces of software, respectively, that are stored in the storage unit 190.

The storage unit 190 may store one or more pieces of card payment information.

The device 100 including the display unit 115 may be electrically connected to a separate electronic device (e.g., a set top box (not shown)) having a tuner. For example, the device 100 may be embodied as an analog television (TV), a digital TV, a three-dimensional (3D) TV, a smart TV, a light-emitting diode (LED) TV, an organic light-emitting diode (OLED) TV, a plasma TV, or a monitor, but it will be obvious to one of ordinary skill in the art that examples of the device 100 are not limited thereto.

At least one of the elements 110 through 190 of the device 100 shown in FIG. 27 may be removed or at least one element may be added thereto, according to performances of the device 100. It will be obvious to one of ordinary skill in the art that positions of the elements 110 through 190 may be changed according to performance or a structure of the device 100.

The aforementioned exemplary embodiments should be considered in a descriptive sense only and not for purposes of limitation, and are not limited to an order of the operations in the flowcharts of FIGS. 6, 7, 13, 14, and 15. According to other exemplary embodiments, some operations may be skipped or added, and an order of some operations may be changed.

The one or more embodiments may be embodied as a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium includes all volatile and non-volatile media, and detachable and non-detachable media which are technically implemented to store information including computer readable commands, data structures, program modules or other data. The communication medium includes computer-readable commands, a data structure, a program module, other data as modulation-type data signals such as carrier signals, or other transmission mechanism, and includes other information transmission mediums.

Throughout the specification, the term 'unit' may indicate a hardware component such as a processor or a circuit, and/or may indicate a software component that is executed by a hardware configuration such as a processor.

It should be understood that the exemplary embodiments described herein should be considered in a descriptive sense only and not for purposes of limitation. Descriptions of features or aspects within each embodiment should typically be considered as available for other similar features or aspects in other embodiments. For example, configuring elements that are singular forms may be executed in a distributed fashion, and also, configuring elements that are distributed may be combined and then executed.

While one or more exemplary embodiments have been described with reference to the figures, it will be understood by those of ordinary skill in the art that various changes in form and details may be made therein without departing from the spirit and scope as defined by the following claims.

The invention claimed is:

1. A first mobile device having a card shape, the first mobile device comprising:
   a storage configured to store one or more pieces of card payment information;
   a payment information transmission circuitry configured to transmit at least one of the one or more pieces of card payment information in a contact or contactless manner to a payment terminal;
   a communication circuitry configured to communicate with a second mobile device; and
   a processor configured to:
      determine whether the first mobile device is in a detached state with respect to the second mobile device or a cover of the second mobile device,
      determine whether to transmit the at least one of the one or more pieces of card payment information, based on the determination of whether the first mobile device is in the detached state, and
      determine that the first mobile device is in the detached state with respect to the second mobile device or the cover of the second mobile device, and according to an elapsed time period after the detached state, the processor is further configured to determine whether to block transmission of the at least one of the one or more pieces of card payment information,
   wherein the first mobile device is operable in the detached state to transmit card payment information to a payment terminal based on a determination that the first mobile device has been in the detached state for less than a specified period of time,
   wherein, when a preset amount of time elapses after the detached state, the processor is further configured to transmit a signal to the second mobile device by using the communication circuitry, and
   wherein if the processor does not receive a response signal responding to the transmitted signal from the second mobile device, the processor is further configured to block transmission of the at least one of the one or more pieces of card payment information.

2. The first mobile device of claim 1, further comprising a communication circuitry configured to communicate with the second mobile device,
   wherein the processor is further configured to transmit, according to an execution request of a payment application, a signal to the second mobile device by using the communication circuitry, and
   wherein if the processor receives a response signal from the second mobile device in response to the transmitted signal, the processor is further configured to determine that the first mobile device is in the detached state but within a predetermined communication range of the second mobile device.

3. The first mobile device of claim 1, further comprising a sensor configured to sense whether the first mobile device is in contact with the cover of the second mobile device, and
   wherein, when the sensor senses that the first mobile device is not in contact with the cover of the second mobile device, the processor is further configured to determine that the first mobile device is in the detached state.

4. The first mobile device of claim 1, wherein the processor is further configured to:
   determine that the first mobile device is in the detached state with respect to the second mobile device or the cover of the second mobile device, and according to an elapsed time period after the detached state, the processor is further configured to determine whether to perform user authentication for transmission of the at least one of the one or more pieces of card payment information.

5. The first mobile device of claim 1, further comprising a communication circuitry configured to communicate with the second mobile device,
   wherein the processor is further configured to transmit a signal to the second mobile device by using the communication circuitry at regular intervals after the first mobile device is detached from the second mobile device or the cover, and
   wherein if the processor does not receive a response signal responding to the transmitted signal from the second mobile device, the processor is further configured to block transmission of the at least one of the one or more pieces of card payment information.

6. The first mobile device of claim 1, further comprising a communication circuitry configured to communicate with the second mobile device, and
   wherein the processor is further configured to receive the one or more pieces of card payment information from the second mobile device by using the communication circuitry.

7. The first mobile device of claim 1, wherein the processor is further configured to select at least one piece of card payment information from among the one or more pieces of card payment information and to transmit the at least one selected piece of card payment information,
   wherein the at least one selected piece of card payment information corresponds to a payment situation.

8. A payment method performed by a first mobile device having a card shape, the payment method comprising:
   determining, using at least one processor of the first mobile device, whether the first mobile device is in a detached state with respect to a second mobile device or a cover of the second mobile device; and
   determining, using the at least one processor of the first mobile device, whether to transmit card payment information, based on the determination of whether the first mobile device is in the detached state,
   wherein the first mobile device is operable in the detached state to transmit the card payment information to a payment terminal based on a determination that the first mobile device has been in the detached state for less than a specified period of time,
   wherein, when a preset amount of time elapses after the detached state, the determining of whether to transmit at least one of one or more pieces of the card payment information comprises transmitting a signal to the second mobile device,
   wherein if a response signal responding to the transmitted signal is not received, the determining of whether to transmit the at least one of the one or more pieces of card payment information comprises blocking transmission of the at least one of the one or more pieces of card payment information, and wherein when the first mobile device receives, in the detached state, user authentication from the second mobile device, the specified period of time is reset.

9. The payment method of claim 8, wherein the determining of whether the first mobile device is in the detached state comprises transmitting a signal to the second mobile device, according to an execution request of a payment application, and wherein if a response signal responding to the transmitted signal is received, the determining of whether the first mobile device is in the detached state comprises determining whether the first mobile device is in the detached state but within a predetermined communication range of the second mobile device.

10. The payment method of claim 8, wherein the determining of whether the first mobile device is in the detached state comprises:

sensing whether the first mobile device is in contact with the cover of the second mobile device, and if the first mobile device is not in contact with the cover of the second mobile device, determining that the first mobile device is in the detached state.

11. The payment method of claim 8, wherein the determining of whether to transmit the at least one of one or more pieces of card payment information comprises:

determining whether to perform user authentication for transmission of the at least one of the one or more pieces of card payment information, according to an elapsed time period after the detached state.

12. The payment method of claim 8, wherein the determining of whether to transmit the at least one of the one or more pieces of card payment information comprises:

determining whether to block transmission of the at least one of the one or more pieces of card payment information, according to an elapsed time period after the detached state.

* * * * *